(12) United States Patent
Zhu et al.

(10) Patent No.: US 12,532,342 B2
(45) Date of Patent: Jan. 20, 2026

(54) METHOD AND APPARATUS FOR APERIODIC CSI MEASUREMENT AND REPORTING

(71) Applicant: Samsung Electronics Co., Ltd., Suwon-si (KR)

(72) Inventors: Dalin Zhu, Richardson, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/654,749

(22) Filed: Mar. 14, 2022

(65) Prior Publication Data

US 2022/0295498 A1 Sep. 15, 2022

Related U.S. Application Data

(60) Provisional application No. 63/161,253, filed on Mar. 15, 2021.

(51) Int. Cl.
*H04W 72/542* (2023.01)
*H04W 56/00* (2009.01)
(Continued)

(52) U.S. Cl.
CPC ....... *H04W 72/542* (2023.01); *H04W 56/001* (2013.01); *H04W 72/046* (2013.01); *H04W 72/23* (2023.01)

(58) Field of Classification Search
CPC ............. H04W 72/542; H04W 56/001; H04W 72/046; H04W 72/23; H04W 72/21;
(Continued)

(56) References Cited

U.S. PATENT DOCUMENTS

2017/0244533 A1* 8/2017 Onggosanusi ....... H04B 7/0478
2018/0062724 A1* 3/2018 Onggosanusi ....... H04B 7/0421
(Continued)

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Tejis Daya

(57) ABSTRACT

Methods and apparatuses for aperiodic channel state information (CSI) measurement and reporting in a wireless communication system. A method for operating a user equipment (UE) includes receiving an indication to enable group-based beam reporting and receiving a channel state information (CSI) request for the group-based beam reporting. The method further includes determining, based on the CSI request, information associated with an aperiodic CSI (A-CSI) trigger state for the group-based beam reporting; determining, based on the information associated with the A-CSI trigger state, first and second sets of CSI resources for the group-based beam reporting; and transmitting resource indicators generated based on at least one of the first and second sets of CSI resources. The resource indicators correspond to at least one of: (1) a synchronization signal block resource indicator (SSBRI) and (2) a CSI reference signal resource indicator (CRI).

17 Claims, 6 Drawing Sheets

(51) Int. Cl.
*H04W 72/044* (2023.01)
*H04W 72/23* (2023.01)

(58) Field of Classification Search
CPC ... H04L 5/0048; H04B 7/0626; H04B 7/0695; H04B 7/06952
See application file for complete search history.

(56) References Cited

U.S. PATENT DOCUMENTS

| | | | |
|---|---|---|---|
| 2018/0219664 A1* | 8/2018 | Guo | H04W 24/10 |
| 2019/0182697 A1* | 6/2019 | Zhang | H04B 7/088 |
| 2019/0207737 A1 | 7/2019 | Babaei et al. | |
| 2020/0029274 A1 | 1/2020 | Cheng et al. | |
| 2020/0059290 A1* | 2/2020 | Pan | H04B 7/0857 |
| 2020/0313823 A1 | 10/2020 | Zhang et al. | |
| 2020/0389220 A1 | 12/2020 | Kang et al. | |
| 2021/0006372 A1* | 1/2021 | Cha | G01S 5/0205 |
| 2021/0059006 A1* | 2/2021 | Babaei | H04W 76/28 |
| 2021/0306045 A1* | 9/2021 | Cha | H04B 17/345 |
| 2021/0351833 A1* | 11/2021 | Sakhnini | H04B 7/0641 |
| 2023/0122910 A1* | 4/2023 | Li | H04W 52/243 |
| | | | 370/329 |
| 2023/0269612 A1* | 8/2023 | Muruganathan | H04L 1/0027 |
| | | | 370/252 |
| 2024/0039602 A1* | 2/2024 | Kim | H04L 5/0048 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP Ts 38.321 version 16.1.0 Release 16)", ETSI TS 138 321 V16.1.0, Jul. 2020, 153 pages.
"5G; NR; Radio Resource Control (RRC); Protocol specification (3GPP Ts 38.331 version 16.1.0 Release 16)", ETSI TS 138 331 V16.1.0, Jul. 2020, 886 pages.
International Search Report and Written Opinion issued Jun. 17, 2022 regarding International Application No. PCT/KR2022/003602, 7 pages.
Extended European Search Report issued Jan. 2, 2025 regarding Application No. 22771730.3, 13 pages.
Samsung, "Remaining details on UE group based beam reporting", 3GPP TSG RAN WG1 Meeting #90bis, R1-1720301, Nov. 2017, 3 pages.
Oppo, "Enhancements on beam management for multi-TRP", 3GPP TSG RAN WG1 #104-e, R1-2100121, Jan. 2021, 7 pages.

\* cited by examiner

METHOD AND APPARATUS FOR APERIODIC CSI MEASUREMENT AND REPORTING

CROSS-REFERENCE TO RELATED APPLICATIONS AND CLAIM OF PRIORITY

The present application claims priority to U.S. Provisional Patent Application No. 63/161,253, filed on Mar. 15, 2021. The content of the above-identified patent document is incorporated herein by reference.

TECHNICAL FIELD

The present disclosure relates generally to wireless communication systems and, more specifically, the present disclosure relates to aperiodic channel state information (CSI) measurement and reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to aperiodic CSI measurement and reporting in a wireless communication system.

In one embodiment, a user equipment (UE) is provided. The UE includes a transceiver configured to receive an indication to enable group-based beam reporting and receive a channel state information (CSI) request for the group-based beam reporting. The UE further includes a processor operably coupled to the transceiver. The processor is configured to determine, based on the CSI request, information associated with an aperiodic CSI (A-CSI) trigger state for the group-based beam reporting and determine, based on the information associated with the A-CSI trigger state, first and second sets of CSI resources for the group-based beam reporting. The transceiver is further configured to transmit, for the group-based beam reporting, resource indicators generated based on at least one of the first and second sets of CSI resources. The resource indicators correspond to at least one of: (1) a synchronization signal block resource indicator (SSBRI) and (2) a CSI reference signal resource indicator (CRI).

In another embodiment, a base station (BS) is provided. The BS includes a processor and a transceiver operably coupled to the processor. The transceiver is configured to transmit an indication to enable group-based beam reporting, transmit a CSI request for the group-based beam reporting to indicate information associated with an A-CSI trigger state for the group-based beam reporting, and receive resource indicators for the group-based beam reporting based on at least one of first and second sets of CSI resources indicated based on the information associated with the A-CSI trigger state. The resource indicators correspond to at least one of a SSBRI and a CRI.

In yet another embodiment, a method for operating a UE is provided. The method includes receiving an indication to enable group-based beam reporting; receiving a CSI request for the group-based beam reporting; determining, based on the CSI request, information associated with a A-CSI trigger state for the group-based beam reporting; determining, based on the information associated with the A-CSI trigger state, first and second sets of CSI resources for the group-based beam reporting; and transmitting resource indicators generated based on at least one of the first and second sets of CSI resources. The resource indicators correspond to at least one of a SSBRI and a CRI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
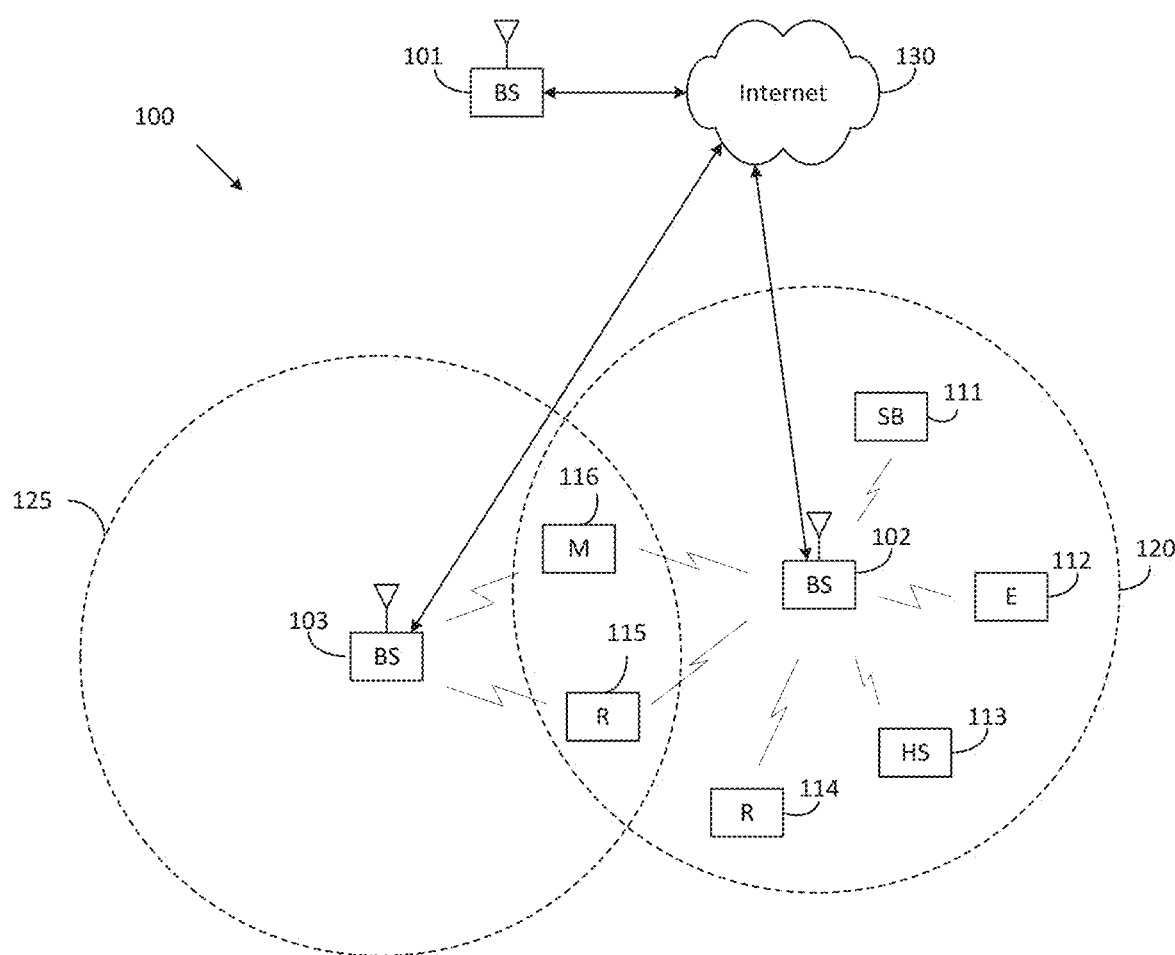
FIG. 1 illustrates an example of wireless network according to embodiments of the present disclosure.
Figure 2:
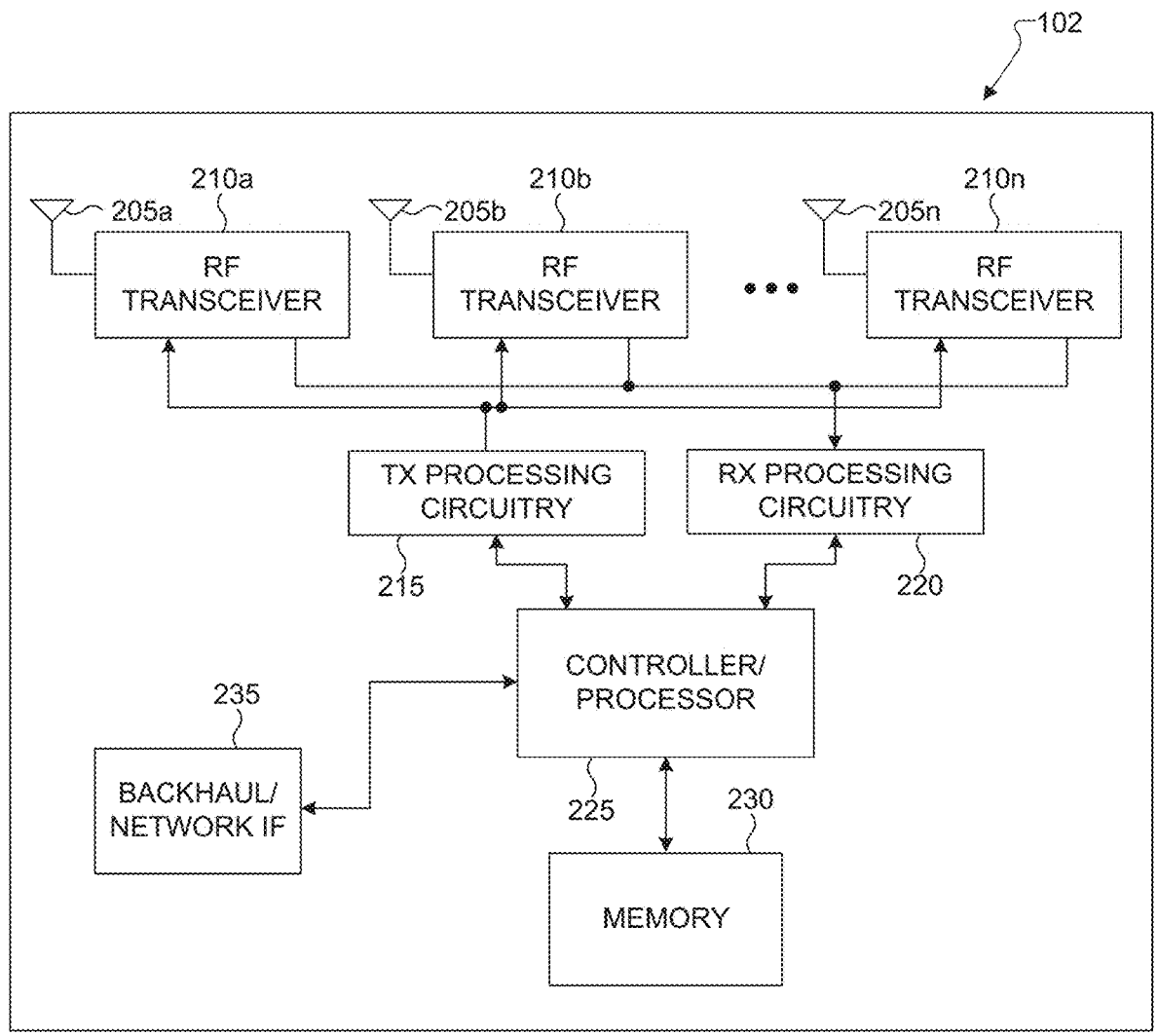
FIG. 2 illustrates an example of gNB according to embodiments of the present disclosure.
Figure 3:
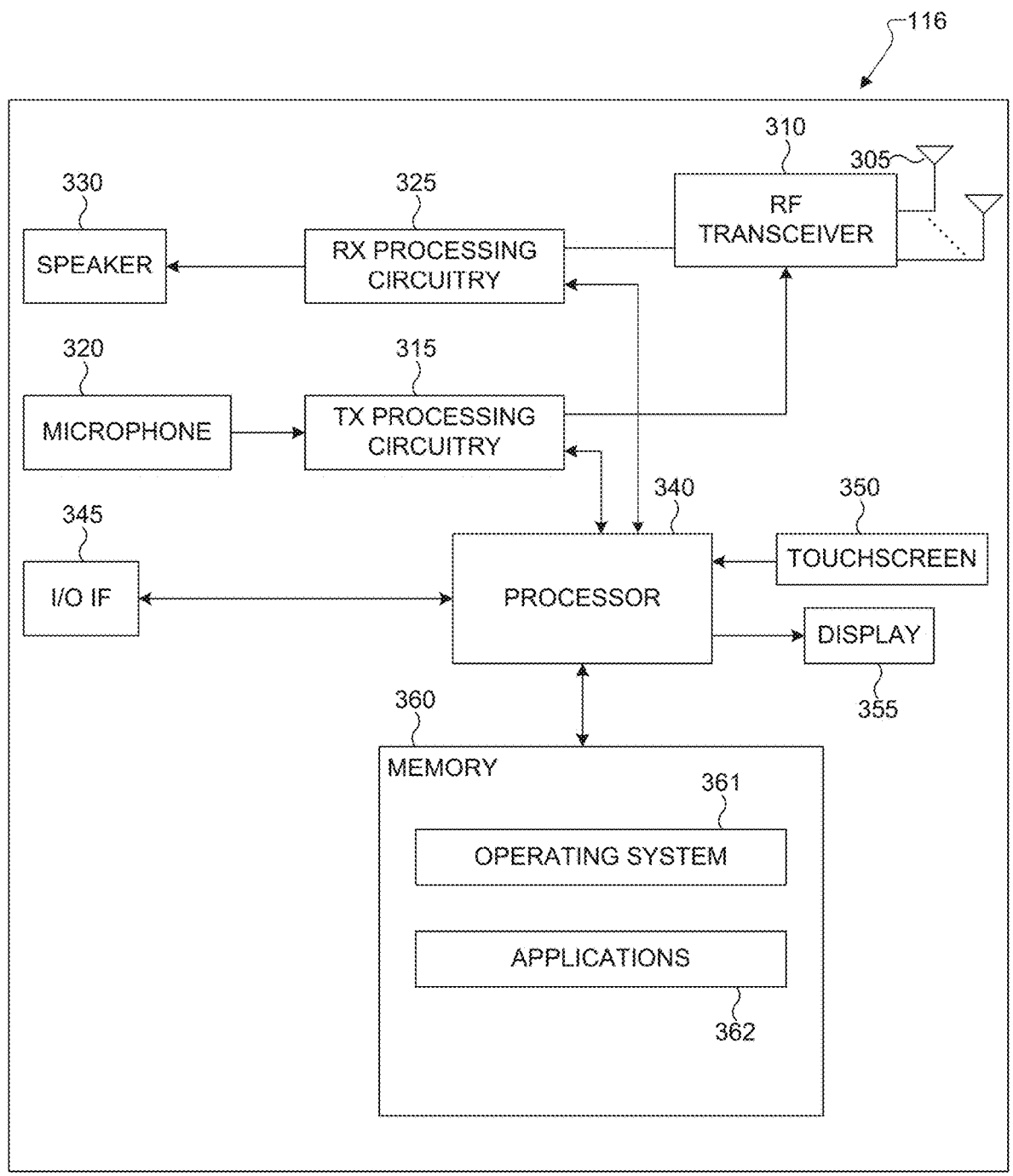
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for aperiodic CSI measurement and reporting in a wireless communication system. In certain embodiments, and one or more of the gNBs 101-103 includes circuitry, programing, or a combination thereof, for measuring and reporting CSI in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support measuring and reporting CSI in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for measuring and reporting CSI in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
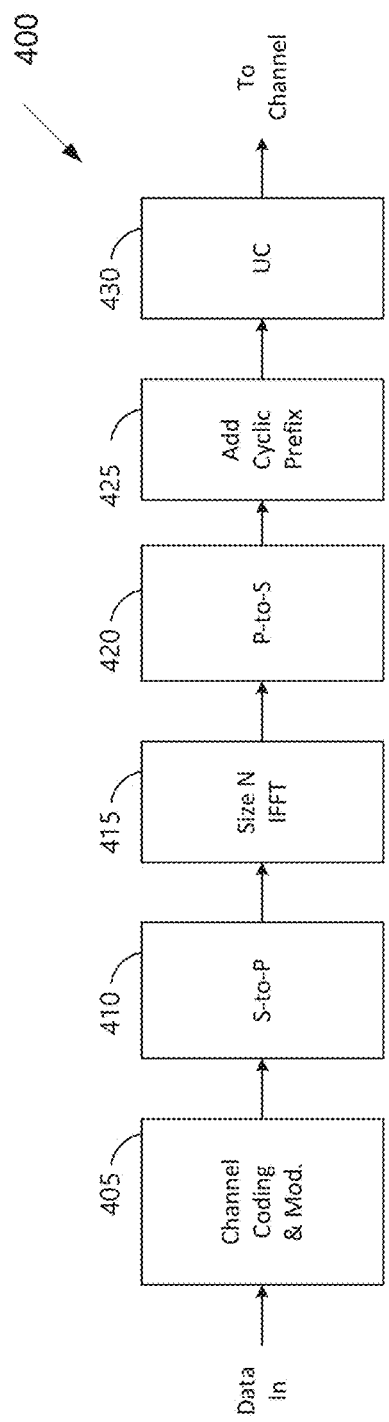
FIGS. 4 and 5 illustrate example of wireless transmit and receive paths according to this disclosure.
Figure 5:
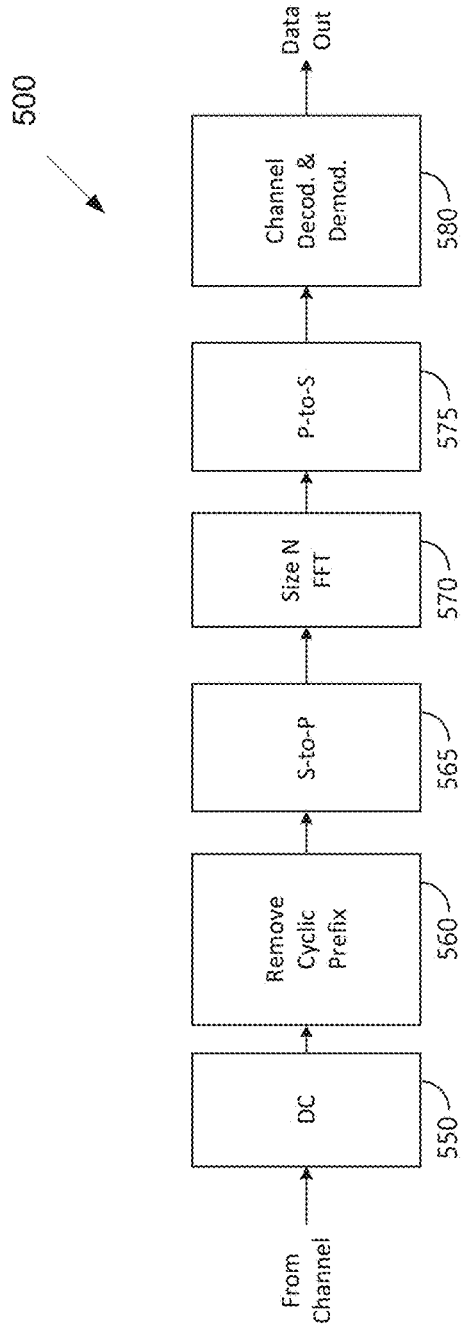

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, the UE could simultaneously receive multiple transmissions from multiple transmission-reception points (TRPs). Different TRPs could share the same physical cell identity (PCI) or have different PCIs. Multiple TRPs could be placed at different locations (i.e., physically non-co-located) and connected through ideal/non-ideal backhauls. Each TRP can include at least one antenna panel comprising of multiple antenna elements/ports. The multiple communication links established between the TRPs and the UE can increase the system throughput and/or improve the system diversity gain.

In the present disclosure, a TRP can represent a collection of measurement antenna ports, measurement RS resources and/or control resource sets (CORESETs). For example, a TRP could be associated with one or more of: (1) a plurality of CSI-RS resources; (2) a plurality of CRIs (CSI-RS resource indices/indicators); (3) a measurement RS resource set, for example, a CSI resource set along with its indicator; (4) a plurality of CORESETs associated with a CORESET-PoolIndex; (5) a plurality of CORESETs associated with a CORESETGroupIndex; (6) a PCI; (7) a PCI index pointing/corresponding to an entry/PCI in a list/set/pool of PCIs that are higher layer configured to the UE; or (8) a plurality of CORESETs associated with a TRP-specific index/indicator/identity.

For the multi-TRP system wherein the UE could simultaneously communicate with multiple TRPs, aperiodic CSI (A-CSI) resource settings/configurations and mechanisms of triggering A-CSI measurement and reporting need to be specified for various combinations of CSI resource/report settings and their associations with the TRPs.

In the present disclosure, detailed A-CSI resource settings/configurations, triggering (e.g., trigger state), measurement and reporting mechanisms are specified for the multi-TRP system, wherein a UE could simultaneously communicate with multiple TRPs. The corresponding CSI resource/reporting settings and how they are associated with/linked to the TRPs are also discussed.

Throughout the present disclosure, a CSI resource set is equivalent to a CSI-RS resource set or vice versa. For instance, a CSI resource set or a CSI resource set could correspond to a SSB resource set provided by a higher layer parameter CSI-SSB-ResourceSet or a non-zero-power (NZP) CSI resource set provided by a higher layer parameter nzp-CSI-RS-ResourceSet.

Furthermore, throughout the present disclosure, a CSI-RS resource is equivalent to a CSI resource or vice versa. For instance, a CSI-RS resource or a CSI resource could correspond to a SSB resource or a NZP CSI-RS resource.

In addition, throughout the present disclosure, a CSI report setting is equivalent to a CSI reporting setting or a CSI reporting configuration, and a CSI resource setting is equivalent to a CSI resource configuration. For instance, a CSI report setting or a CSI reporting setting or a CSI reporting configuration could be provided by a higher layer parameter CSI-ReportConfig, and a CSI resource setting or a CSI resource configuration could be provided by a higher layer parameter CSI-ResourceConfig.

The UE could communicate with the TRPs in the multi-TRP system under either a single-PDCCH/DCI based framework or a multi-PDCCH/DCI based framework.

The UE provides to the network the downlink channel conditions via the CSI reporting. The CSI could comprise of one or more of the following information, such as CSI-RS resource indicator (CRI), rank indicator (RI), precoding matrix indicator (PMI), channel quality indicator (CQI) and etc. In the 5G NR, the CSI reporting could be explicitly triggered/requested by the network in an aperiodic manner through some form of signaling, such as via a CSI request field in a DCI or a flag in an uplink scheduling grant. Further, the A-CSI report(s) could be multiplexed on PUSCH, on dynamically assigned resource(s).

More specifically, the UE receives from the network one or more A-CSI triggers through either DCI signaling only or a combination of MAC CE and DCI signaling. One A-CSI trigger could indicate one candidate A-CSI trigger state in the list of A-CSI trigger states configured to the UE (e.g., via higher layer CSI-AperiodicTriggerStateList), and therefore, the corresponding CSI resource/reporting setting(s). For instance, the A-CSI trigger could be in form of the CSI request in DCI format 1_0, which specifies the index of the A-CSI trigger state of interest in the list of A-CSI trigger states.

Denote the number of bits in the CSI request field in DCI by $N_{TS}$, where $N_{TS} \in \{0, 1, 2, \ldots, N_C\}$. Both $N_{TS}$ and $N_C$ could be determined according to various factors such as the number of TRPs in the multi-TRP system, and configured to the UE by the network via higher layer RRC signaling. When the number of candidate A-CSI trigger states (denoted by Ntot) in the list of A-CSI trigger states is less than or equal to $2^{N_{TS}}-1$ (i.e., the bit length of the CSI request field in DCI is larger than or equal to the total number of candidate A-CSI trigger states in the list of A-CSI trigger states), the CSI request field in DCI indicates an A-CSI trigger state in the list of A-CSI trigger states.

When the number of candidate A-CSI trigger states Ntot in the list of A-CSI trigger states is greater than $2^{N_{TS}}-1$ (i.e., the bit length of the CSI request field in DCI is smaller than the total number of candidate A-CSI trigger states in the list of A-CSI trigger states), the UE receives from the network a MAC CE subselection command (A-CSI trigger state subselection MAC CE), which is used to map up to $N_S$ A-CSI trigger states to the codepoints of the CSI request field in DCI. In this case, the CSI request in DCI (i.e., the A-CSI trigger) would correspond to a codepoint, and therefore, a corresponding A-CSI trigger state, in the A-CSI trigger state subselection MAC CE containing a subset of all candidate A-CSI trigger states in the list of A-CSI trigger states.

In the 3GPP Rel. 15/16, the A-CSI trigger state for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as follows: (1) each A-CSI trigger state configured using the higher layer parameter CSI-AperiodicTriggerState is associated with one or multiple CSI reporting settings (CSI-ReportConfig's) where each CSI reporting setting CSI-ReportConfig is linked to periodic, or semi-persistent, or aperiodic resource setting(s); (2) if a CSI resource setting linked to a CSI reporting setting CSI-ReportConfig has multiple aperiodic CSI resource sets, only one of the aperiodic CSI resource sets from the CSI resource setting is associated with the trigger state, and the UE is higher layer configured per trigger state per CSI resource setting to select the one CSI resource set from the CSI resource setting; and/or (3) further, the UE is not expected to receive more than one DCI with non-zero CSI request per slot, and the UE is not expected to receive more than one aperiodic CSI report request for transmission in a given slot.

In the present disclosure, various configurations of A-CSI trigger state and the corresponding CSI reporting setting/CSI resource setting are specified for the multi-TRP operation assuming both single-PDCCH/DCI and multi-PDCCH/DCI based frameworks.

In the single-PDCCH/DCI based multi-TRP system, a single PDCCH or DCI format is used to schedule one or more spatial layers of one or more PDSCHs transmitted from the TRPs. The PDSCH could be transmitted from one or more TRPs in the multi-TRP system. For instance, the single PDCCH/DCI could be transmitted from a primary TRP, with which the UE would conduct high-priority operations such as initial access, common search space (CSS) monitoring, and etc. For another example, the single DCI format could be transmitted from all TRPs in the multi-TRP system, e.g., by repeating the same DCI content/payload across different TRPs or transmitting separate parts of the same DCI payload from different TRPs. In FIG. 4, a conceptual example of the single-PDCCH/DCI based multi-TRP operation is depicted. In this example, the multi-TRP system comprises two TRPs, denoted by TRP-1 and TRP-2, and TRP-1 is the primary TRP, which transmits the single PDCCH or DCI format to the UE. The PDCCH/DCI schedules two spatial layers, denoted by Layer-1 and Layer-2 of a single PDSCH, transmitted from TRP-1 and TRP-2, respectively.

Figure 6:
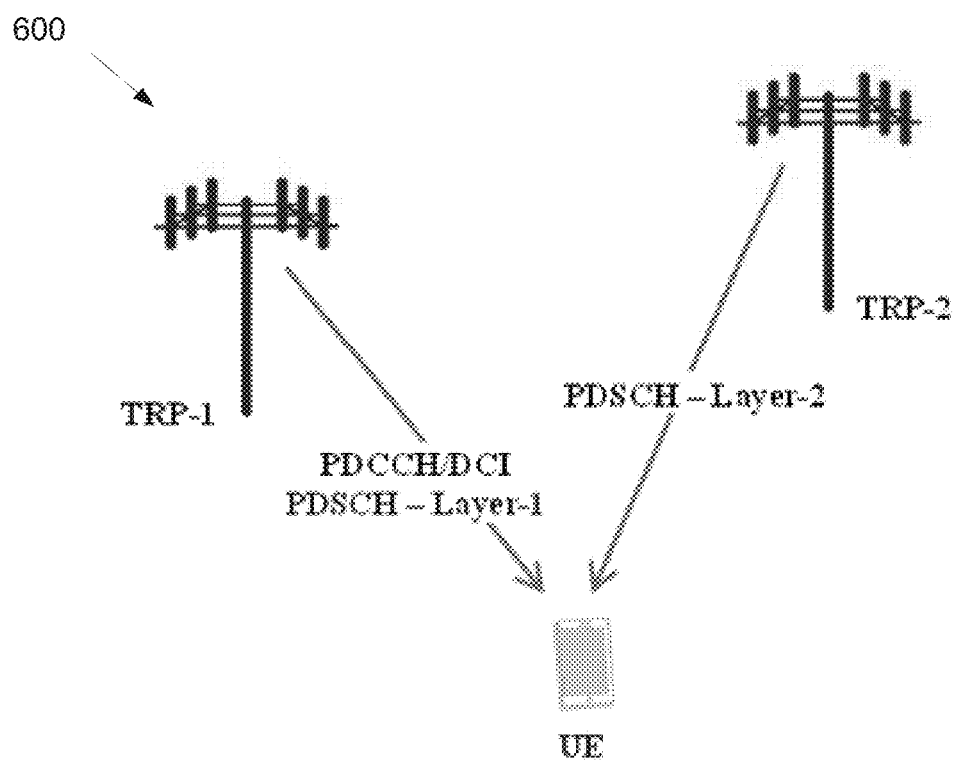
FIG. 6 illustrates an example of single-PDCCH/DCI based multi-TRP operation according to embodiments of the present disclosure.

FIG. 6 illustrates an example of single-PDCCH/DCI based multi-TRP operation 600 according to embodiments of the present disclosure. An embodiment of the single-PDCCH/DCI based multi-TRP operation 600 shown in FIG. 6 is for illustration only.

In a given slot, the UE could receive an A-CSI trigger (e.g., a non-zero CSI request in DCI format 1_0), which indicates/links to an A-CSI trigger state (from the list of A-CSI trigger states configured to the UE) for one or multiple CSI resource settings and/or CSI reporting settings configured for all TRPs in the multi-TRP system. The UE would measure the aperiodic CSI-RS resources based on the configured CSI resource setting(s) and report to the network the measurement results according to the configured CSI reporting setting(s).

In one embodiment of Configuration-1, the A-CSI trigger state is associated with one or multiple CSI-RS resources in a single CSI resource set in a single CSI resource setting and one or multiple CSI reports a single CSI reporting setting.

In one embodiment of CSI resource setting in Configuration-1, the UE is higher layer configured with M=1 CSI resource setting (e.g., CSI-ResourceConfig), and the configured CSI resource setting comprises S=1 CSI resource set corresponding to at least one of: (1) a SSB resource set provided by CSI-SSB-ResourceSet and (2) a NZP CSI-RS resource set provided by nzp-CSI-RS-ResourceSet. The Ks≥1 SSB or NZP CSI-RS resources configured in the CSI resource set are divided into Ms≥1 CSI resource subsets, corresponding to the first CSI resource subset, the second CSI resource subset, and so on, and the Ms-th CSI resource subset; for example, the first CSI resource subset could have the lowest CSI resource subset ID value, the second CSI resource subset could have the second lowest CSI resource subset ID value, and so on, and the Ms-th CSI resource subset could have the highest CSI resource subset ID value (other association/mapping relationships between the ordering of the CSI resource subsets and the CSI resource subset ID values are also possible); each CSI resource subset, and therefore the SSB/NZP CSI-RS resources configured therein, could be associated with one or more TRPs in the multi-TRP system.

In one example Option-1a.1, the mapping/association between the Ms CSI resource subsets and the Ntrp TRPs in the multi-TRP system can be established in an implicit manner. For instance, for Ms=Ntrp=2, the first CSI resource subset containing one or more SSB/NZP CSI-RS resources could be associated with the first TRP and the second CSI resource subset containing one or more SSB/NZP CSI-RS resources could be associated with the second TRP. In one example, the first TRP could correspond to the first TRP in a list of TRPs configured to the UE and the second TRP could correspond to the second TRP in the list of TRPs configured to the UE. In another example, the first TRP could correspond to the TRP with the lowest TRP-specific ID value and the second TRP could correspond to the TRP with the second lowest TRP-specific ID value.

In the preset disclosure, a TRP-specific ID could correspond to a higher layer TRP-specific signaling index, a PCI, a PCI index pointing to an entry/PCI in a list/set/pool of PCIs that are higher layer configured to the UE, a value of CORESETPoolIndex, a value of CORESETGroupIndex, a SCI, a measurement RS resource set ID such as SSB/CSI-RS resource set ID, a CORESETs subset ID, a CORESET ID/index and etc. Other implicit mapping/association rules between the Ms CSI resource subsets and the Ntrp TRPs in the multi-TRP system are also possible, and they may be known to the UE a prior.

In one example of Option-1a.2, the UE could be explicitly indicated by the network the mapping relationship/association rule between the Ms CSI resource subsets (and therefore, the corresponding SSB/NZP CSI-RS resources configured therein) and the Ntrp TRPs in the multi-TRP system. This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting. In one example, the UE could be configured by the network a TRP ID list containing Ntrp TRP-specific IDs.

For instance, for Ms=Ntrp=2, the first CSI resource subset containing one or more SSB/NZP CSI-RS resources could be associated with the first entry (and therefore, the corresponding TRP-specific ID) in the TRP ID list and the second CSI resource subset containing one or more SSB/NZP CSI-RS resources could be associated with the second entry (and therefore, the corresponding TRP-specific ID) in the TRP ID list. In the present disclosure, a TRP-specific ID could correspond to a higher layer TRP-specific signaling index, a PCI, a PCI index pointing to an entry/PCI in a list/set/pool of PCIs that are higher layer configured to the UE, a value of CORESETPoolIndex, a value of CORESETGroupIndex, a SCI, a measurement RS resource set ID such as SSB/CSI-RS resource set ID, a CORESETs subset ID, a CORESET ID/index and etc. Other explicit methods of indicating the mapping relationship/association rule between the Ms CSI resource subsets and the Ntrp TRPs in the multi-TRP system are also possible.

For both Option-1a.1 and Option-1a.2, the UE may be higher layer configured by the network how the CSI-RS resources in the CSI resource set are partitioned into Ms CSI resource subsets. For instance, for Ms=2, the first CSI resource subset could contain the first half of the CSI-RS resources in the CSI resource set, while the second CSI resource subset could contain the second half of the CSI-RS resources in the CSI resource set.

Alternatively, the UE could receive a MAC CE based activation command indicating how the CSI-RS resources in the CSI resource set are partitioned into Ms CSI resource subsets. For example, a MAC CE message (such as a bit sequence) can be used for this purpose. The UE could also be indicated via dynamic DCI based triggering how the CSI-RS resources in the CSI resource set are partitioned into Ms CSI resource subsets. For instance, code points of a parameter in the DCI can be used for this purpose.

There are various other configuration/indication methods discussed below: (1) the partition of the CSI-RS resources in the CSI resource set into Ms CSI resource subsets is based on a combination of higher layer (RRC) configuration and MAC CE activation; (2) the partition of the CSI-RS resources in the CSI resource set into Ms CSI resource subsets is based on a combination of higher layer (RRC) configuration and DCI based triggering; (3) the partition of the CSI-RS resources in the CSI resource set into Ms CSI resource subsets is based on a combination of MAC CE activation and DCI based triggering; and/or (4) the partition of the CSI-RS resources in the CSI resource set into Ms CSI resource subsets is based on a combination of higher layer (RRC) configuration, MAC CE activation, and DCI based triggering.

In one embodiment of CSI reporting setting in Configuration-1, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports.

In one example of Option-1b.1, the UE could report in a single reporting instance/CSI report Ng≥1 pairs/groups of resource indicators (such as SSBRIs/CRIs) and the corresponding beam metrics (such as L1-RSRPs). Each resource indicator/beam metric in each pair/group of resource indicators/beam metrics corresponds to a TRP. For instance, for Ntrp=2, the first resource indicator/beam metric in each pair/group of resource indicators/beam metrics could be associated with the first TRP and the second resource indicator/beam metric in each pair/group of resource indicators/beam metrics could be associated with the second TRP. In one example, the first TRP could correspond to the first TRP in a list of TRPs configured to the UE and the second TRP could correspond to the second TRP in the list of TRPs configured to the UE. I In another example, the first TRP could correspond to the TRP with the lowest TRP-specific ID value and the second TRP could correspond to the TRP with the second lowest TRP-specific ID value. Alternatively, the UE could be indicated by the network a TRP ID list containing Ntrp TRP-specific IDs. For instance, for Ntrp=2, the first resource indicator/beam metric in each group/pair of resource indicators/beam metrics could be associated with the first entry (and therefore, the corresponding TRP-specific ID) in the TRP ID list and the second resource indicator/beam metric in each group/pair of resource indicators/beam metrics could be associated with the second entry (and therefore, the corresponding TRP-specific ID) in the TRP ID list. In this disclosure, a TRP-specific ID could correspond to one or more of a higher layer TRP-specific signaling index, PCI, SCI, measurement RS resource set ID such as SSB/CSI-RS resource set ID, CORESETs subset ID and etc.

In one example of Option-1b.2, the UE could report in a single reporting instance all of or a subset of the Ntrp CSI reports dynamically, i.e., the UE could report X≤Ntrp CSI reports, $\{CSI(x), x=0, 1, \ldots, X-1\}$, where the value of X could be fixed, or configured to the UE via RRC, or MAC CE, or DCI, or a combination of at least two of RRC, MAC CE, and DCI, or autonomously determined by the UE and reported to the network as part of the CSI report and/or a separate CSI parameter and/or jointly with another parameter such as RI, CRI and etc. If the value of X is chosen dynamically by the UE, the X CSI reports can be partitioned into two parts, CSI part 1 and CSI part 2.

In one example, the CSI part 1 and part 2 are as follows: (1) the CSI part 1 includes $x_1 < X$ CSI reports, where $x_1$ is fixed or configured (e.g., $x_1=1$), and an indication about the remaining $x_2=X-x_1$ CSI reports. This information can be a bitmap of length Ntrp. The payload (number of bits) of the CSI part 1 is fixed; and/or (2) the CSI part 2 includes the remaining $x_2$ CSI reports. The payload of the CSI part 2 is variable depending on the value of $x_2$. In one example, $x_2=0$ is allowed. In one example, $x_2>0$.

The two parts of the CSI report can be transmitted (reported) by the UE via a two-part UCI (cf. Rel. 15 two-part UCI).

In one example of Option-1b.3, the UE could report in Ntrp separate reporting instances Ntrp CSI reports, each associated with a TRP in the multi-TRP system. For instance, for Ntrp=2, the first CSI report in the first reporting instance could be associated with the first TRP and the second CSI report in the second reporting instance could be associated with the second TRP. In one example, the first TRP could correspond to the first TRP in a list of TRPs configured to the UE and the second TRP could correspond to the second TRP in the list of TRPs configured to the UE.

In another example, the first TRP could correspond to the TRP with the lowest TRP-specific ID value and the second TRP could correspond to the TRP with the second lowest TRP-specific ID value. Alternatively, the UE could be indicated by the network a TRP ID list containing Ntrp TRP-specific IDs. For instance, for Ntrp=2, the first CSI report in the first reporting instance could be associated with the first entry (and therefore, the corresponding TRP-specific ID) in the TRP ID list and the second CSI report in the second reporting instance could be associated with the second entry (and therefore, the corresponding TRP-specific ID) in the TRP ID list.

In the present disclosure, a TRP-specific ID could correspond to one or more of a higher layer TRP-specific signaling index, PCI, SCI, measurement RS resource set ID such as SSB/CSI-RS resource set ID, CORESETs subset ID and etc.

In one embodiment of A-CSI trigger state in Configuration-1, the A-CSI trigger state in Configuration-1 for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined in following instances.

In one instance, each A-CSI trigger state configured using the higher layer parameter CSI-AperiodicTriggerState is associated with a single CSI reporting setting (CSI-ReportConfig) where the CSI reporting setting CSI-ReportConfig is linked to a single periodic, or semi-persistent, or aperiodic CSI resource setting.

In another instance, the CSI resource setting comprises of one CSI resource set, which further comprises of at least one of the Ms CSI resource subsets. The Ms CSI resource subsets are linked to Ntrp TRPs in the multi-TRP system following Option-1a.1 and/or Option-1a.2. If the CSI resource setting linked to a CSI-ReportConfig has multiple aperiodic CSI resource sets, only one of the aperiodic CSI resource sets from the CSI resource setting is associated with the trigger state, and the UE is higher layer configured per trigger state per CSI resource setting to select the one CSI-IM/NZP CSI-RS resource set from the CSI resource setting.

In yet another instance, the CSI reporting setting comprises of one or multiple CSI reports. The association between the CSI report(s) and the TRPs in the multi-TRP system could follow Option-1b.1, Option-1b.2, and/or Option-1b.3.

In yet another instance, further, if, e.g., the UE is higher layer configured/indicated that Configuration-1 for the multi-TRP operation is enabled, the UE is not expected to receive more than one DCI with non-zero CSI request per slot, and the UE is not expected to receive more than one aperiodic CSI report request for transmission in a given slot.

In one embodiment of Configuration-2, the A-CSI trigger state is defined for one or multiple CSI-RS resources in a single CSI resource set in a single CSI resource setting and multiple CSI reporting settings.

In one embodiment of CSI resource setting in Configuration-2, the CSI resource setting in Configuration-2 is the same as the CSI resource setting in Configuration-1. That is, the UE is higher layer configured with M=1 CSI resource setting (e.g., CSI-ResourceConfig), and the configured CSI resource setting comprises of S=1 CSI resource set. The Ks≥1 CSI-RS resources configured in the CSI resource set are divided into Ms≥1 CSI resource subsets, which could be regarded/labeled as the first CSI resource subset, the second CSI resource subset, and so on, and the Ms-th CSI resource subset; for example, the first CSI resource subset could have the lowest CSI resource subset ID value, the second CSI resource subset could have the second lowest CSI resource subset ID value, and so on, and the Ms-th CSI resource subset could have the highest CSI resource subset ID value (other association/mapping relationships between the ordering of the CSI resource subsets and the CSI resource subset ID values are also possible); each CSI resource subset, and therefore the CSI-RS resources therein, could be associated with one or more TRPs in the multi-TRP system.

The detailed association/mapping between the CSI resource subsets (and therefore, the CSI-RS resources therein) and the TRPs in the multi-TRP system could follow those discussed in Option-1a.1 and Option-1a.2.

In one embodiment of CSI reporting setting in Configuration-2, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings the CSI reporting setting ID values are also possible); each CSI reporting setting could be associated with one or more TRPs in the multi-TRP system. A single TRP in the multi-TRP system could be associated with a single CSI reporting setting.

In one example of Option-2b.1, the UE could report all of or a subset of the P CSI reports dynamically (here, each CSI report is associated with a separate CSI reporting setting), i.e., the UE could report Y≤P CSI reports, {CSI(y), y=0, 1, . . . , Y−1}, where the value of Y could be fixed, or configured to the UE via RRC, or MAC CE, or DCI, or a combination of at least two of RRC, MAC CE, and DCI, or automatously determined by the UE and reported to the network as part of the CSI report and/or a separate CSI parameter and/or jointly with another parameter such as RI, CRI and etc. If the value of Y is chosen dynamically by the UE, the Y CSI reports can be partitioned into two parts, CSI part 1 and CSI part 2.

In one example, the CSI part 1 and part 2 are as follows: (1) the CSI part 1 includes $y_1<Y$ CSI reports, where $y_1$ is fixed or configured (e.g., $y_1=1$), and an indication about the remaining $y_2=Y-y_1$ CSI reports. This information can be a bitmap of length P. The payload (number of bits) of the CSI part 1 is fixed; and/or (2) the CSI part 2 includes the remaining $y_2$ CSI reports. The payload of the CSI part 2 is variable depending on the value of $y_2$. In one example, $y_2=0$ is allowed. In one example, $y_2>0$.

The two parts of the CSI report can be transmitted (reported) by the UE via a two-part UCI (cf. Rel. 15 two-part UCI).

In one example of Option-2b.2, the UE could report in P separate reporting instances P CSI reports, each associated with one or more TRPs in the multi-TRP system. For instance, for P=Ntrp=2, the first CSI reporting setting could be associated with the first TRP and the second CSI reporting setting could be associated with the second TRP. In one example, the first TRP could correspond to the first TRP in a list of TRPs configured to the UE, the second TRP could correspond to the second TRP in the list of TRPs configured to the UE, and so on, and the last TRP could correspond to the last TRP in the list of TRPs configured to the UE. In another example, the first TRP could correspond to the TRP with the lowest TRP-specific ID value, the second TRP could correspond to the TRP with the second lowest TRP-specific ID value, and so on, and the last TRP could correspond to the TRP with the highest TRP-specific ID value.

Alternatively, the UE could be explicitly indicated by the network the mapping relationship/association rule between the P CSI reporting settings and the Ntrp TRPs in the multi-TRP system. This indication could be via higher layer (RRC) or/and MAC CE or/and DCI based signaling. In one example, this indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting. In one example, the UE could be configured by the network a TRP ID list containing Ntrp TRP-specific IDs.

For instance, for P=Ntrp=2, the first CSI reporting setting could be associated with the first entry (and therefore, the corresponding TRP-specific ID) in the TRP ID list and the second CSI reporting setting could be associated with the second entry (and therefore, the corresponding TRP-specific ID) in the TRP ID list. In this disclosure, a TRP-specific ID could correspond to one or more of a higher layer TRP-specific signaling index, PCI, SCI, measurement RS resource set ID such as SSB/CSI-RS resource set ID, CORESETs subset ID and etc.

In one embodiment of A-CSI trigger state in Configuration-2, the A-CSI trigger state in Configuration-2 for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with at least one of the P>1 CSI reporting settings (CSI-ReportConfig's) where the associated CSI reporting setting(s) is linked to a single periodic, or semi-persistent, or aperiodic CSI resource setting.

In another instance, the CSI resource setting comprises of one CSI resource set, which further comprises of at least one of the Ms CSI resource subsets. The Ms CSI resource subsets are linked to Ntrp TRPs in the multi-TRP system following Option-1a.1 and/or Option-1a.2. If the CSI resource setting linked to a CSI-ReportConfig has multiple aperiodic CSI resource sets, only one of the aperiodic CSI resource sets from the CSI resource setting is associated with the trigger state, and the UE is higher layer configured per trigger state per CSI resource setting to select the one CSI-IM/NZP CSI-RS resource set from the CSI resource setting.

In yet another instance, the P CSI reporting settings (each CSI reporting setting comprises of one or more CSI reports) are linked to Ntrp TRPs in the multi-TRP system following Option-2b.1 and/or Option-2b.2.

In yet another instance, further, if, e.g., the UE is higher layer configured/indicated that Configuration-2 for the multi-TRP operation is enabled, the UE is not expected to receive more than one DCI with non-zero CSI request per slot, and the UE is not expected to receive more than one aperiodic CSI report request for transmission in a given slot.

In one embodiment of Configuration-3, the A-CSI trigger state is defined for multiple CSI resource sets in a single CSI resource setting and one or multiple CSI reports in a single CSI reporting setting.

In one embodiment of CSI resource setting in Configuration-3, the UE is higher layer configured with M=1 CSI resource setting (e.g., CSI-ResourceConfig), and the configured CSI resource setting comprises of S>1 CSI resource sets, which could be regarded/labeled as the first CSI resource set, the second CSI resource set, and so on, and the S-th CSI resource set; for example, the first CSI resource set could have the lowest CSI resource set ID value, the second CSI resource set could have the second lowest CSI resource set ID value, and so on, and the S-th CSI resource set could have the highest CSI resource set ID value (other association/mapping relationships between the ordering of the CSI resource sets and the CSI resource set ID values are also possible); each CSI resource set, and therefore the CSI-RS resources therein, could be associated with one or more TRPs in the multi-TRP system.

In one example of Option-3a.1, the mapping/association between the S CSI resource sets and the Ntrp TRPs in the multi-TRP system can be established in an implicit manner. For instance, for S=Ntrp=2, the first CSI resource set containing one or more CSI-RS resources could be associated with the first TRP and the second CSI resource set containing one or more CSI-RS resources could be associated with the second TRP. In one example, the first TRP could correspond to the first TRP in a list of TRPs configured to the UE and the second TRP could correspond to the second TRP in the list of TRPs configured to the UE. In another example, the first TRP could correspond to the TRP with the lowest TRP-specific ID value and the second TRP could correspond to the TRP with the second lowest TRP-specific ID value.

In the present disclosure, a TRP-specific ID could correspond to one or more of a higher layer TRP-specific signaling index, PCI, SCI, measurement RS resource set ID such as SSB/CSI-RS resource set ID, CORESETs subset ID and etc. Other implicit mapping/association rules between the Ms CSI resource subsets and the Ntrp TRPs in the multi-TRP system are also possible, and they may be known to the UE a prior.

In one example of Option-3a.2, the UE could be explicitly indicated by the network the mapping relationship/association rule between the S CSI resource sets (and therefore, the corresponding CSI-RS resources therein) and the Ntrp TRPs in the multi-TRP system. This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

In one example, the UE could be configured by the network a TRP ID list containing Ntrp TRP-specific IDs. For instance, for S=Ntrp=2, the first CSI resource set containing one or more CSI-RS resources could be associated with the first entry (and therefore, the corresponding TRP-specific ID) in the TRP ID list and the second CSI resource set containing one or more CSI-RS resources could be associated with the second entry (and therefore, the corresponding TRP-specific ID) in the TRP ID list.

In the present disclosure, a TRP-specific ID could correspond to one or more of a higher layer TRP-specific signaling index, PCI, SCI, measurement RS resource set ID such as SSB/CSI-RS resource set ID, CORESETs subset ID and etc. Other explicit methods of indicating the mapping relationship/association rule between the S CSI resource sets and the Ntrp TRPs in the multi-TRP system are also possible.

In one example of CSI reporting setting in Configuration-3, the CSI reporting setting in Configuration-3 is the same as the CSI reporting setting in Configuration-1. That is, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports. The detailed association/mapping between the CSI report(s) and the Ntrp TRPs in the multi-TRP system could follow those discussed in Option-1b.1, Option-1b.2, and/or Option-1b.3.

In one embodiment of A-CSI trigger state in Configuration-3, for periodic or semi-persistent CSI resource settings, the A-CSI trigger state in Configuration-3 could be associated to a CSI reporting setting (e.g., configured with the higher layer parameter reportConfigType set to "aperiodic") and/or a CSI resource setting (e.g., provided by higher layer parameter CSI-ResourceConfig) for channel and/or interference measurement (e.g., for L1-RSRP or L1-SINR measurement) according to the following instances.

In one instance, the A-CSI trigger state configured using the higher layer parameter CSI-AperiodicTriggerState is associated with a single CSI reporting setting (e.g., provided by the higher layer parameter CSI-ReportConfig), wherein the CSI reporting setting CSI-ReportConfig is linked to a single periodic or semi-persistent CSI resource setting.

In another instance, the above described periodic or semi-persistent CSI resource setting comprises S>1 (e.g., S=2) CSI resource sets, each corresponding to at least one of: (1) a SSB resource set or (2) a NZP CSI-RS resource set for channel measurement (e.g., for L1-RSRP measurement or L1-SINR measurement). The S>1 CSI resource sets are linked to Ntrp TRPs in the multi-TRP system following those specified in Option-3a.1 and/or Option-3a.2 in the present disclosure. For S=2, the first CSI resource set could correspond to the first SSB resource set/NZP CSI-RS resource set or the SSB resource set/NZP CSI-RS resource set with the lowest resource set index/ID corresponding to the first entry in the higher layer parameter csi-RS-ResourceSetList configured in the CSI resource setting provided by CSI-ResourceConfig, and the second CSI resource set could correspond to the second SSB resource set/NZP CSI-RS resource set or the SSB resource set/NZP CSI-RS resource set with the highest resource set index/ID corresponding to the second entry in the higher layer parameter csi-RS-ResourceSetList configured in the CSI resource setting provided by CSI-ResourceConfig; alternatively, the first CSI resource set could correspond to a SSB resource set provided by higher layer parameter CSI-SSB-ResourceSet1 configured in the CSI resource setting provided by CSI-ResourceConfig or a NZP CSI-RS resource set provided by higher layer parameter nzp-CSI-RS-ResourceSet1 configured in the CSI resource setting provided by CSI-ResourceConfig, and the second CSI resource set could correspond to a SSB resource set provided by higher layer parameter CSI-SSB-ResourceSet2 configured in the CSI resource setting provided by CSI-ResourceConfig or a NZP CSI-RS resource set provided by higher layer parameter nzp-CSI-RS-ResourceSet2 configured in the CSI resource setting provided by CSI-ResourceConfig. In this case (e.g., the UE could be higher layer indicated/configured that Configuration-3 for the multi-TRP operation is enabled), for the UE configured with the higher layer parameter CSI-AperiodicTriggerStateList, if a CSI resource setting linked to a CSI reporting setting provided by CSI-ReportConfig has multiple (S>1) aperiodic CSI resource sets, at least two of the S>1 aperiodic CSI resource sets from the CSI resource setting are associated with the trigger state.

In yet another instance, the CSI reporting setting comprises one or multiple CSI reports. The association between the CSI report(s) and the TRPs in the multi-TRP system could follow those specified in Option-1b.1, Option-1b.2, and/or Option-1b.3 in the present disclosure.

In yet another instance, further, if, e.g., the UE is higher layer configured/indicated that Configuration-3 for the multi-TRP operation is enabled, the UE is not expected to receive more than one DCI with non-zero CSI request per slot, and the UE is not expected to receive more than one aperiodic CSI report request for transmission in a given slot.

In another embodiment of A-CSI trigger state in Configuration-3, the A-CSI trigger state in Configuration-3 for aperiodic CSI resource settings is defined as following instances.

In one instance, the A-CSI trigger state configured using the higher layer parameter CSI-AperiodicTriggerState is associated with S>1 (e.g., S=2) CSI resource sets each corresponding to at least one of: (1) a SSB resource set or (2) a NZP CSI-RS resource set for channel measurement (e.g., for L1-RSRP measurement and L1-SINR measurement). For S=2, as shown in TABLE 1, the first CSI resource set could correspond to a SSB resource set provided by higher layer parameter CSI-SSB-ResourceSet or CSI-SSB-ResourceSet1 configured in resourcesForChannel in the higher layer parameter CSI-AssociatedReportConfigInfo associated with the A-CSI trigger state or a NZP CSI-RS resource set provided by higher layer parameter nzp-CSI-RS or nzp-CSI-RS1 configured in resourcesForChannel in the higher layer parameter CSI-AssociatedReportConfigInfo associated with the A-CSI trigger state, and the second CSI resource set could correspond to a SSB resource set provided by higher layer parameter CSI-SSB-ResourceSet2 configured in resourcesForChannel in the higher layer parameter CSI-AssociatedReportConfigInfo associated with the A-CSI trigger state or a NZP CSI-RS resource set provided by higher layer parameter nzp-CSI-RS2 configured in resourcesForChannel in the higher layer parameter CSI-AssociatedReportConfigInfo associated with the A-CSI trigger state; alternatively, as illustrated in TABLE 2, the first CSI resource set could correspond to a SSB resource set or a NZP CSI-RS resource set configured in resourcesForChannel or resourcesForChannel1 in the higher layer parameter CSI-AssociatedReportConfigInfo associated with the A-CSI trigger state, and the second CSI resource set could correspond to a SSB resource set or a NZP CSI-RS resource set configured in resourcesForChannel2 in the higher layer parameter CSI-AssociatedReportConfigInfo associated with the A-CSI trigger state.

TABLE 1

An example of higher layer parameters CSI-AperiodicTriggerState and CSI-AssociatedReportConfigInfo

```
CSI-AperiodicTriggerState ::= SEQUENCE {
    associatedReportConfigInfoList              SEQUENCE
(SIZE(1..maxNrofReportConfigPerAperiodicTrigger))
                            OF CSI-AssociatedReportConfigInfo,
    ...
}
CSI-AssociatedReportConfigInfo ::= SEQUENCE {
    reportConfigId              CSI-ReportConfigId,
    resourcesForChannel         CHOICE {
        nzp-CSI-RS SEQUENCE {
            resourceSet         INTEGER (1..maxNrofNZP-CSI-RS-ResourceSetsPerConfig),
            qcl-info            SEQUENCE (SIZE(1..maxNrofAP-CSI-RS-ResourcesPerSet))
                            OF TCI-StateId OPTIONAL -- Cond Aperiodic
        },
        nzp-CSI-RS2 SEQUENCE {
            resourceSet         INTEGER (1..maxNrofNZP-CSI-RS-ResourceSetsPerConfig),
            qcl-info            SEQUENCE (SIZE(1..maxNrofAP-CSI-RS-ResourcesPerSet))
                            OF TCI-StateId OPTIONAL -- Cond Aperiodic
        },
        csi-SSB-ResourceSet     INTEGER (1..maxNrofCSI-SSB-ResourceSetsPerConfig)
        csi-SSB-ResourceSet2    INTEGER (1..maxNrofCSI-SSB-ResourceSetsPerConfig)
    },
    csi-IM-ResourcesForInterference     INTEGER(1..maxNrofCSI-IM-
ResourceSetsPerConfig),
    nzp-CSI-RS-ResourcesForInterference  INTEGER    (1..maxNrofNZP-CSI-RS-
ResourceSetsPerConfig)
    ...
}
```

TABLE 2

Another example of higher layer parameters CSI-AperiodicTriggerState and CSI-AssociatedReportConfigInfo

```
CSI-AperiodicTriggerState ::= SEQUENCE {
    associatedReportConfigInfoList              SEQUENCE
(SIZE(1..maxNrofReportConfigPerAperiodicTrigger))
                            OF CSI-AssociatedReportConfigInfo,
    ...
}
```

TABLE 2-continued

Another example of higher layer parameters CSI-AperiodicTriggerState and CSI-AssociatedReportConfigInfo

```
CSI-AssociatedReportConfigInfo ::= SEQUENCE {
  reportConfigId            CSI-ReportConfigId,
  resourcesForChannel         CHOICE {
    nzp-CSI-RS SEQUENCE {
      resourceSet         INTEGER (1..maxNrofNZP-CSI-RS-ResourceSetsPerConfig),
      qcl-info            SEQUENCE (SIZE(1..maxNrofAP-CSI-RS-ResourcesPerSet))
                          OF TCI-StateId OPTIONAL -- Cond Aperiodic
    },
    csi-SSB-ResourceSet        INTEGER (1..maxNrofCSI-SSB-ResourceSetsPerConfig)
  },
  resourcesForChannel2        CHOICE {
    nzp-CSI-RS SEQUENCE {
      resourceSet         INTEGER (1..maxNrofNZP-CSI-RS-ResourceSetsPerConfig),
      qcl-info            SEQUENCE (SIZE(1..maxNrofAP-CSI-RS-ResourcesPerSet))
                          OF TCI-StateId OPTIONAL -- Cond Aperiodic
    },
    csi-SSB-ResourceSet        INTEGER (1..maxNrofCSI-SSB-ResourceSetsPerConfig)
  },
  csi-IM-ResourcesForInterference           INTEGER(1..maxNrofCSI-IM-
ResourceSetsPerConfig),
  nzp-CSI-RS-ResourcesForInterference   INTEGER     (1..maxNrofNZP-CSI-RS-
ResourceSetsPerConfig)
  ...
}
```

In another instance, the CSI reporting setting comprises one or multiple CSI reports. The association between the CSI report(s) and the TRPs in the multi-TRP system could follow those specified in Option-1b.1, Option-1b.2, and/or Option-1b.3 in the present disclosure.

In yet another instance, further, if, e.g., the UE is higher layer configured/indicated that Configuration-3 for the multi-TRP operation is enabled, the UE is not expected to receive more than one DCI with non-zero CSI request per slot, and the UE is not expected to receive more than one aperiodic CSI report request for transmission in a given slot.

In one embodiment of Configuration-4, the A-CSI trigger state is defined for multiple CSI resource sets in a single CSI resource setting and multiple CSI reporting settings.

In one embodiment of CSI resource setting in Configuration-4, the CSI resource setting in Configuration-4 is the same as the CSI resource setting in Configuration-3. That is, the UE is higher layer configured with M=1 CSI resource setting (e.g., CSI-ResourceConfig), and the configured CSI resource setting comprises of S>1 CSI resource sets, which could be regarded/labeled as the first CSI resource set, the second CSI resource set, and so on, and the S-th CSI resource set; for example, the first CSI resource set could have the lowest CSI resource set ID value, the second CSI resource set could have the second lowest CSI resource set ID value, and so on, and the S-th CSI resource set could have the highest CSI resource set ID value (other association/ mapping relationships between the ordering of the CSI resource sets and the CSI resource set ID values are also possible); each CSI resource set, and therefore the CSI-RS resources therein, could be associated with one or more TRPs in the multi-TRP system. The detailed association/ mapping between the S CSI resource sets and the Ntrp TRPs in the multi-TRP system could follow those discussed in Option-3a.1 and/or Option-3a.2.

In one embodiment of CSI reporting setting in Configuration-4, the CSI reporting setting in Configuration-4 is the same as the CSI reporting setting in Configuration-2. That is, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings the CSI reporting setting ID values are also possible); each CSI reporting setting could be associated with one or more TRPs in the multi-TRP system. A single TRP in the multi-TRP system could be associated with a single CSI reporting setting. The detailed association/mapping between the P CSI reporting settings and the Ntrp TRPs in the multi-TRP system could follow those discussed in Option-2b.1 and/or Option-2b.2.

In one embodiment of A-CSI trigger state in Configuration-4, for periodic or semi-persistent CSI resource settings, the A-CSI trigger state in Configuration-4 could be associated to multiple (more than one) CSI reporting settings (configured with the higher layer parameter reportConfigType set to "aperiodic") and/or a CSI resource setting (e.g., provided by higher layer parameter CSI-ResourceConfig) for channel and/or interference measurement (e.g., for L1-RSRP or L1-SINR measurement) as according to the following instances.

In one instance, the A-CSI trigger state configured using the higher layer parameter CSI-AperiodicTriggerState is associated with one or more of the P>1 CSI reporting settings (CSI-ReportConfig's), where the associated CSI reporting settings could be linked to a single periodic or semi-persistent CSI resource setting.

In another instance, the above described periodic or semi-persistent CSI resource setting comprises S>1 (e.g., S=2) CSI resource sets, each corresponding to at least one of: (1) a SSB resource set or (2) a NZP CSI-RS resource set for channel measurement (e.g., for L1-RSRP measurement or L1-SINR measurement). The S>1 CSI resource sets are linked to Ntrp TRPs in the multi-TRP system following those specified in Option-3a.1 and/or Option-3a.2 in the present disclosure. For S=2, the first CSI resource set could correspond to the first SSB resource set/NZP CSI-RS resource set or the SSB resource set/NZP CSI-RS resource set with the lowest resource set index/ID corresponding to the first entry in the higher layer parameter csi-RS-ResourceSetList configured in the CSI resource setting provided by CSI-ResourceConfig, and the second CSI resource set could correspond to the second SSB resource set/NZP CSI-RS resource set or the SSB resource set/NZP CSI-RS resource set with the highest resource set index/ID corresponding to the second entry in the higher layer parameter csi-RS-ResourceSetList configured in the CSI resource setting provided by CSI-ResourceConfig; alternatively, the first CSI resource set could correspond to a SSB resource set provided by higher layer parameter CSI-SSB-ResourceSet1 configured in the CSI resource setting provided by CSI-ResourceConfig or a NZP CSI-RS resource set provided by higher layer parameter nzp-CSI-RS-ResourceSet1 configured in the CSI resource setting provided by CSI-ResourceConfig, and the second CSI resource set could correspond to a SSB resource set provided by higher layer parameter CSI-SSB-ResourceSet2 configured in the CSI resource setting provided by CSI-ResourceConfig or a NZP CSI-RS resource provided by higher layer parameter nzp-CSI-RS-ResourceSet2 configured in the CSI resource setting provided by CSI-ResourceConfig. In this case (e.g., the UE could be higher layer indicated/configured that Configuration-4 for the multi-TRP operation is enabled), for the UE configured with the higher layer parameter CSI-AperiodicTriggerStateList, if a CSI resource setting linked to one or more CSI reporting settings provided by CSI-ReportConfig's has multiple (S>1) aperiodic CSI resource sets, at least two of the S>1 aperiodic CSI resource sets from the CSI resource setting are associated with the trigger state.

In yet another instance, the P>1 CSI reporting settings (each CSI reporting setting comprises one or more CSI reports) are linked to Ntrp TRPs in the multi-TRP system following those specified in Option-2b.1 and/or Option-2b.2 in the present disclosure.

In yet another instance, further, if, e.g., the UE is higher layer configured/indicated that Configuration-4 for the multi-TRP operation is enabled, the UE is not expected to receive more than one DCI with non-zero CSI request per slot, and the UE is not expected to receive more than one aperiodic CSI report request for transmission in a given slot.

In another embodiment of A-CSI trigger state in Configuration-4, the A-CSI trigger state in Configuration-4 for aperiodic CSI resource settings is defined as following instances.

In one instance, the A-CSI trigger state configured using the higher layer parameter CSI-AperiodicTriggerState is associated with S>1 (e.g., S=2) CSI resource sets each corresponding to at least one of: (1) a SSB resource set or (2) a NZP CSI-RS resource set for channel measurement (e.g., for L1-RSRP measurement and L1-SINR measurement). For S=2, as shown in TABLE 1 in the present disclosure, the first CSI resource set could correspond to a SSB resource set provided by higher layer parameter CSI-SSB-ResourceSet or CSI-SSB-ResourceSet1 configured in resourcesForChannel in the higher layer parameter CSI-AssociatedReportConfigInfo associated with the A-CSI trigger state or a NZP CSI-RS resource set provided by higher layer parameter nzp-CSI-RS or nzp-CSI-RS1 configured in resourcesForChannel in the higher layer parameter CSI-AssociatedReportConfigInfo associated with the A-CSI trigger state, and the second CSI resource set could correspond to a SSB resource set provided by higher layer parameter CSI-SSB-ResourceSet2 configured in resourcesForChannel in the higher layer parameter CSI-AssociatedReportConfigInfo associated with the A-CSI trigger state or a NZP CSI-RS resource set provided by higher layer parameter nzp-CSI-RS2 configured in resourcesForChannel in the higher layer parameter CSI-AssociatedReportConfigInfo associated with the A-CSI trigger state; alternatively, as illustrated in TABLE 2, the first CSI resource set could correspond to a SSB resource set or a NZP CSI-RS resource set configured in resourcesForChannel or resourcesForChannel1 in the higher layer parameter CSI-AssociatedReportConfigInfo associated with the A-CSI trigger state, and the second CSI resource set could correspond to a SSB resource set or a NZP CSI-RS resource set configured in resourcesForChannel2 in the higher layer parameter CSI-AssociatedReportConfigInfo associated with the A-CSI trigger state.

In another instance, the P>1 CSI reporting settings (each CSI reporting setting comprises one or more CSI reports) are linked to Ntrp TRPs in the multi-TRP system following those specified in Option-2b.1 and/or Option-2b.2 in the present disclosure.

In yet another instance, further, if, e.g., the UE is higher layer configured/indicated that Configuration-4 for the multi-TRP operation is enabled, the UE is not expected to receive more than one DCI with non-zero CSI request per slot, and the UE is not expected to receive more than one aperiodic CSI report request for transmission in a given slot.

In one embodiment of Configuration-5, the A-CSI trigger state is defined for multiple CSI resource settings and one or multiple CSI reports in a single CSI reporting setting.

In one embodiment of CSI resource setting in Configuration-5, the UE is higher layer configured with M>1 CSI resource settings (e.g., CSI-ResourceConfig's with different CSI resource setting IDs CSI-ResourceConfigId's), which could be regarded/labeled as the first CSI resource setting, the second CSI resource setting, and so on, and the M-th CSI resource setting; for example, the first CSI resource setting could have the lowest CSI resource setting ID value, the second CSI resource setting could have the second lowest CSI resource setting ID value, and so on, and the M-th CSI resource setting could have the highest CSI resource setting ID value (other association/mapping relationships between the ordering of the CSI resource settings and the CSI resource setting ID values are also possible); each CSI resource setting, and therefore the CSI resource set(s)/resource(s) therein, could be associated with one or more TRPs in the multi-TRP system.

In one example of Option-5a.1, the mapping/association between the M CSI resource settings and the Ntrp TRPs in the multi-TRP system can be established in an implicit manner. For instance, for M=Ntrp=2, the first CSI resource setting containing one or more CSI resource sets/resources could be associated with the first TRP and the second CSI resource setting containing one or more CSI resource sets/resources could be associated with the second TRP.

In one example, the first TRP could correspond to the first TRP in a list of TRPs configured to the UE and the second TRP could correspond to the second TRP in the list of TRPs configured to the UE. In another example, the first TRP could correspond to the TRP with the lowest TRP-specific ID value and the second TRP could correspond to the TRP with the second lowest TRP-specific ID value.

In the present disclosure, a TRP-specific ID could correspond to one or more of a higher layer TRP-specific signaling index, PCI, SCI, measurement RS resource set ID such as SSB/CSI-RS resource set ID, CORESETs subset ID and etc. Other implicit mapping/association rules between the M CSI resource settings and the Ntrp TRPs in the multi-TRP system are also possible, and they may be known to the UE a prior.

In one example of Option-5a.2, the UE could be explicitly indicated by the network the mapping relationship/association rule between the M CSI resource settings (and therefore, the corresponding CSI resource sets/resources therein) and the Ntrp TRPs in the multi-TRP system. This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

In one example, the UE could be configured by the network a TRP ID list containing Ntrp TRP-specific IDs. For instance, for M=Ntrp=2, the first CSI resource setting containing one or more CSI resource sets/resources could be associated with the first entry (and therefore, the corresponding TRP-specific ID) in the TRP ID list and the second CSI resource setting containing one or more CSI resource sets/resources could be associated with the second entry (and therefore, the corresponding TRP-specific ID) in the TRP ID list. In this disclosure, a TRP-specific ID could correspond to one or more of a higher layer TRP-specific signaling index, PCI, SCI, measurement RS resource set ID such as SSB/CSI-RS resource set ID, CORESETs subset ID and etc. Other explicit methods of indicating the mapping relationship/association rule between the M CSI resource settings and the Ntrp TRPs in the multi-TRP system are also possible.

In one embodiment of CSI reporting setting in Configuration-5, the CSI reporting setting in Configuration-5 is the same as the CSI reporting setting in Configuration-1. That is, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports. The detailed association/mapping between the CSI report(s) and the Ntrp TRPs in the multi-TRP system could follow those discussed in Option-1b.1, Option-1b.2, and/or Option-1b.3.

In one embodiment of A-CSI trigger state in Configuration-5, the A-CSI trigger state in Configuration-5 for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with a single CSI reporting setting (CSI-ReportConfig) where the CSI reporting setting CSI-ReportConfig is linked to at least one of the M>1 periodic, or semi-persistent, or aperiodic CSI resource settings.

In another instance, the M CSI resource settings are linked to Ntrp TRPs in the multi-TRP system following Option-5a.1 and/or Option-5a.2. In this case (e.g., the UE could be higher layer indicated/configured that Configuration-5 for the multi-TRP operation is enabled), for the UE configured with the higher layer parameter CSI-AperiodicTriggerStateList, at least one of the M CSI resource settings are associated with the trigger state.

In another instance, the CSI reporting setting comprises of one or multiple CSI reports. The association between the CSI report(s) and the TRPs in the multi-TRP system could follow Option-1b.1, Option-1b.2, and/or Option-1b.3.

In yet another instance, further, if, e.g., the UE is higher layer configured/indicated that Configuration-5 for the multi-TRP operation is enabled, the UE is not expected to receive more than one DCI with non-zero CSI request per slot, and the UE is not expected to receive more than one aperiodic CSI report request for transmission in a given slot.

In one embodiment of Configuration-6, the A-CSI trigger state is defined for multiple CSI resource settings and multiple CSI reporting settings.

In one embodiment of CSI resource setting in Configuration-6, the CSI resource setting in Configuration-6 is the same as the CSI resource setting in Configuration-5. That is, the UE is higher layer configured with M>1 CSI resource settings (e.g., CSI-ResourceConfig's with different CSI resource setting IDs CSI-ResourceConfigId's), which could be regarded/labeled as the first CSI resource setting, the second CSI resource setting, and so on, and the M-th CSI resource setting; for example, the first CSI resource setting could have the lowest CSI resource setting ID value, the second CSI resource setting could have the second lowest CSI resource setting ID value, and so on, and the M-th CSI resource setting could have the highest CSI resource setting ID value (other association/mapping relationships between the ordering of the CSI resource settings and the CSI resource setting ID values are also possible); each CSI resource setting, and therefore the CSI resource set(s)/resource(s) therein, could be associated with one or more TRPs in the multi-TRP system. The detailed association/mapping between the M CSI resource settings and the Ntrp TRPs in the multi-TRP system could follow those discussed in Option-5a.1, and/or Option-5a.2.

In one embodiment of CSI reporting setting in Configuration-6, the CSI reporting setting in Configuration-6 is the same as the CSI reporting setting in Configuration-2. That is, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings the CSI reporting setting ID values are also possible); each CSI reporting setting could be associated with one or more TRPs in the multi-TRP system.

A single TRP in the multi-TRP system could be associated with a single CSI reporting setting. The detailed association/mapping between the P CSI reporting settings and the Ntrp TRPs in the multi-TRP system could follow those discussed in Option-2b.1 and/or Option-2b.2.

In one embodiment of A-CSI trigger state in Configuration-6, the A-CSI trigger state in Configuration-6 for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with at least one of the P CSI reporting settings (CSI-ReportConfig's) where the associated CSI reporting setting(s) is linked to at least one of the M periodic, or semi-persistent, or aperiodic CSI resource settings.

In another instance, the M CSI resource settings are linked to Ntrp TRPs in the multi-TRP system following Option-5a.1 and/or Option-5a.2. In this case (e.g., the UE could be higher layer indicated/configured that Configuration-6 for the multi-TRP operation is enabled), for the UE configured with the higher layer parameter CSI-AperiodicTriggerStateList, at least one of the M CSI resource settings are associated with the trigger state.

In yet another instance, the P CSI reporting settings (each CSI reporting setting comprises of one or more CSI reports) are linked to Ntrp TRPs in the multi-TRP system following Option-2b.1 and/or Option-2b.2.

In yet another instance, further, if, e.g., the UE is higher layer configured/indicated that Configuration-6 for the multi-TRP operation is enabled, the UE is not expected to receive more than one DCI with non-zero CSI request per slot, and the UE is not expected to receive more than one aperiodic CSI report request for transmission in a given slot.

The UE could be configured/indicated by the network a bitmap of Ntrp. Each bit in the bitmap indicates a subset of all CSI-RS resources (and therefore, the corresponding CSI resource subsets/CSI-RS resource sets/CSI resource settings) associated with the trigger state and a subset of all CSI reports (and therefore, the corresponding CSI reporting setting(s)) associated with the trigger state. This bitmap indication could be via higher layer (RRC) or/and MAC CE or/and DCI based signaling. This bitmap indication is via a separate (dedicated) parameter or joint with another parameter. Likewise, this bitmap indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

For Configuration-1, the first bit in the bitmap indicates the first CSI resource subset, the second bit in the bitmap indicates the second CSI resource subset, and so on, and the Ntrp-th bit in the bitmap indicates the last (or the Ms-th) CSI resource subset. For a single CSI report configured in the CSI reporting setting, the first bit in the bitmap indicates the first resource indicator/beam metric in each group/pair of resource indicators/beam metrics, the second bit in the bitmap indicates the second resource indicator/beam metric in each group/pair of resource indicators/beam metrics, and so on, and the Ntrp-th bit in the bitmap indicates the last (or the Ntrp-th) resource indicator/beam metric in each group/pair of resource indicators/beam metrics. For multiple CSI reports configured in the CSI reporting setting, the first bit in the bitmap indicates the first CSI report, the second bit in the bitmap indicates the second CSI report, and so on, and the Ntrp-th bit in the bitmap indicates the last (or the Ntrp-th) CSI report.

In one example, if all the bits in the bitmap are configured as 1's, the UE would measure all CSI-RS resources in all the Ms CSI resource subsets associated with the A-CSI trigger state, and send to the network all the CSI report(s) configured in the CSI reporting setting associated with the A-CSI trigger state.

In another example, if the i-th bit in the bitmap is configured as 1, the UE would measure the CSI-RS resources configured in the i-th CSI resource subset associated with the A-CSI trigger state, and send to the network the i-th CSI report configured in the CSI reporting setting associated with the A-CSI trigger state, or the i-th resource indicator/beam metric in each group/pair of resource indicators/beam metrics configured in the CSI reporting setting associated with the A-CSI trigger state.

In another example, if the j-th bit in the bitmap is configured as 0, the UE would not measure the CSI-RS resources configured in the j-th CSI resource subset associated with the A-CSI trigger state; the UE would not send to the network the j-th CSI report configured in the CSI reporting setting associated with the A-CSI trigger state, nor the j-th resource indicator/beam metric in each group/pair of resource indicators/beam metrics in the single CSI report configured in the CSI reporting setting associated with the A-CSI trigger state.

For Configuration-2, the first bit in the bitmap indicates the first CSI resource subset, the second bit in the bitmap indicates the second CSI resource subset, and so on, and the Ntrp-th bit in the bitmap indicates the last (or the Ms-th) CSI resource subset. Further, the first bit in the bitmap indicates the first CSI reporting setting, the second bit in the bitmap indicates the second CSI reporting setting, and so on, and the Ntrp-th bit in the bitmap indicates the last (or the P-th) CSI reporting setting.

In one example, if all the bits in the bitmap are configured as 1's, the UE would measure all CSI-RS resources in all the Ms CSI resource subsets associated with the A-CSI trigger state, and send to the network all the CSI report(s) configured in all the P>1 CSI reporting settings associated with the A-CSI trigger state.

In another example, if the i-th bit in the bitmap is configured as 1, the UE would measure the CSI-RS resources configured in the i-th CSI resource subset associated with the A-CSI trigger state, and send to the network the CSI report(s) configured in the i-th CSI reporting setting associated with the A-CSI trigger state.

In another example, if the j-th bit in the bitmap is configured as 0, the UE would not measure the CSI-RS resources configured in the j-th CSI resource subset associated with the A-CSI trigger state; the UE would not send to the network the CSI report(s) configured in the j-th CSI reporting setting associated with the A-CSI trigger state.

For Configuration-3, the first bit in the bitmap indicates the first CSI resource set, the second bit in the bitmap indicates the second CSI resource set, and so on, and the Ntrp-th bit in the bitmap indicates the last (or the S-th) CSI resource set. For a single CSI report configured in the CSI reporting setting, the first bit in the bitmap indicates the first resource indicator/beam metric in each group/pair of resource indicators/beam metrics, the second bit in the bitmap indicates the second resource indicator/beam metric in each group/pair of resource indicators/beam metrics, and so on, and the Ntrp-th bit in the bitmap indicates the last (or the Ntrp-th) resource indicator/beam metric in each group/pair of resource indicators/beam metrics.

For multiple CSI reports configured in the CSI reporting setting, the first bit in the bitmap indicates the first CSI report, the second bit in the bitmap indicates the second CSI report, and so on, and the Ntrp-th bit in the bitmap indicates the last (or the Ntrp-th) CSI report.

In one example, if all the bits in the bitmap are configured as 1's, the UE would measure all CSI-RS resources in all the S CSI resource sets associated with the A-CSI trigger state, and send to the network all the CSI report(s) configured in the CSI reporting setting associated with the A-CSI trigger state.

In another example, if the i-th bit in the bitmap is configured as 1, the UE would measure the CSI-RS resources configured in the i-th CSI resource set associated with the A-CSI trigger state, and send to the network the i-th CSI report configured in the CSI reporting setting associated with the A-CSI trigger state, or the i-th resource indicator/beam metric in each group/pair of resource indicators/beam metrics configured in the CSI reporting setting associated with the A-CSI trigger state.

In another example, if the j-th bit in the bitmap is configured as 0, the UE would not measure the CSI-RS resources configured in the j-th CSI resource set associated with the A-CSI trigger state; the UE would not send to the network the j-th CSI report configured in the CSI reporting setting associated with the A-CSI trigger state, nor the j-th resource indicator/beam metric in each group/pair of resource indicators/beam metrics in the single CSI report configured in the CSI reporting setting associated with the A-CSI trigger state.

For Configuration-4, the first bit in the bitmap indicates the first CSI resource set, the second bit in the bitmap indicates the second CSI resource set, and so on, and the Ntrp-th bit in the bitmap indicates the last (or the S-th) CSI resource set. Further, the first bit in the bitmap indicates the first CSI reporting setting, the second bit in the bitmap indicates the second CSI reporting setting, and so on, and the Ntrp-th bit in the bitmap indicates the last (or the P-th) CSI reporting setting.

In one example, if all the bits in the bitmap are configured as 1's, the UE would measure all CSI-RS resources in all the S CSI resource sets associated with the A-CSI trigger state, and send to the network all the CSI report(s) configured in all the P>1 CSI reporting settings associated with the A-CSI trigger state.

In another example, if the i-th bit in the bitmap is configured as 1, the UE would measure the CSI-RS resources configured in the i-th CSI resource set associated with the A-CSI trigger state, and send to the network the CSI report(s) configured in the i-th CSI reporting setting associated with the A-CSI trigger state.

In another example, if the j-th bit in the bitmap is configured as 0, the UE would not measure the CSI-RS resources configured in the j-th CSI resource set associated with the A-CSI trigger state; the UE would not send to the network the CSI report(s) configured in the j-th CSI reporting setting associated with the A-CSI trigger state.

For Configuration-5, the first bit in the bitmap indicates the first CSI resource setting, the second bit in the bitmap indicates the second CSI resource setting, and so on, and the Ntrp-th bit in the bitmap indicates the last (or the M-th) CSI resource setting. For a single CSI report configured in the CSI reporting setting, the first bit in the bitmap indicates the first resource indicator/beam metric in each group/pair of resource indicators/beam metrics, the second bit in the bitmap indicates the second resource indicator/beam metric in each group/pair of resource indicators/beam metrics, and so on, and the Ntrp-th bit in the bitmap indicates the last (or the Ntrp-th) resource indicator/beam metric in each group/pair of resource indicators/beam metrics.

For multiple CSI reports configured in the CSI reporting setting, the first bit in the bitmap indicates the first CSI report, the second bit in the bitmap indicates the second CSI report, and so on, and the Ntrp-th bit in the bitmap indicates the last (or the Ntrp-th) CSI report.

In one example, if all the bits in the bitmap are configured as 1's, the UE would measure all CSI-RS resources in all the M CSI resource settings associated with the A-CSI trigger state, and send to the network all the CSI report(s) configured in the CSI reporting setting associated with the A-CSI trigger state.

In another example, if the i-th bit in the bitmap is configured as 1, the UE would measure the CSI-RS resources configured in the i-th CSI resource setting associated with the A-CSI trigger state, and send to the network the i-th CSI report configured in the CSI reporting setting associated with the A-CSI trigger state, or the i-th resource indicator/beam metric in each group/pair of resource indicators/beam metrics configured in the CSI reporting setting associated with the A-CSI trigger state.

In another example, if the j-th bit in the bitmap is configured as 0, the UE would not measure the CSI-RS resources configured in the j-th CSI resource setting associated with the A-CSI trigger state; the UE would not send to the network the j-th CSI report configured in the CSI reporting setting associated with the A-CSI trigger state, nor the j-th resource indicator/beam metric in each group/pair of resource indicators/beam metrics in the single CSI report configured in the CSI reporting setting associated with the A-CSI trigger state.

For Configuration-6, the first bit in the bitmap indicates the first CSI resource setting, the second bit in the bitmap indicates the second CSI resource setting, and so on, and the Ntrp-th bit in the bitmap indicates the last (or the M-th) CSI resource setting. Further, the first bit in the bitmap indicates the first CSI reporting setting, the second bit in the bitmap indicates the second CSI reporting setting, and so on, and the Ntrp-th bit in the bitmap indicates the last (or the P-th) CSI reporting setting.

In one example, if all the bits in the bitmap are configured as 1's, the UE would measure all CSI-RS resources in all the M CSI resource settings associated with the A-CSI trigger state, and send to the network all the CSI report(s) configured in all the P>1 CSI reporting settings associated with the A-CSI trigger state.

In another example, if the i-th bit in the bitmap is configured as 1, the UE would measure the CSI-RS resources configured in the i-th CSI resource setting associated with the A-CSI trigger state, and send to the network the CSI report(s) configured in the i-th CSI reporting setting associated with the A-CSI trigger state.

In another example, if the j-th bit in the bitmap is configured as 0, the UE would not measure the CSI-RS resources configured in the j-th CSI resource setting associated with the A-CSI trigger state; the UE would not send to the network the CSI report(s) configured in the j-th CSI reporting setting associated with the A-CSI trigger state.

One or more of the CSI resource settings/configurations, one or more of the CSI report settings/configurations, and/or one or more of the A-CSI trigger states defined in Configuration-1, Configuration-2, Configuration-3, Configuration-4, Configuration-5 and/or Configuration-6 could be enabled when the UE is indicated/configured by the network that the group based beam/CSI reporting for the multi-TRP operation is enabled. This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

Figure 7:
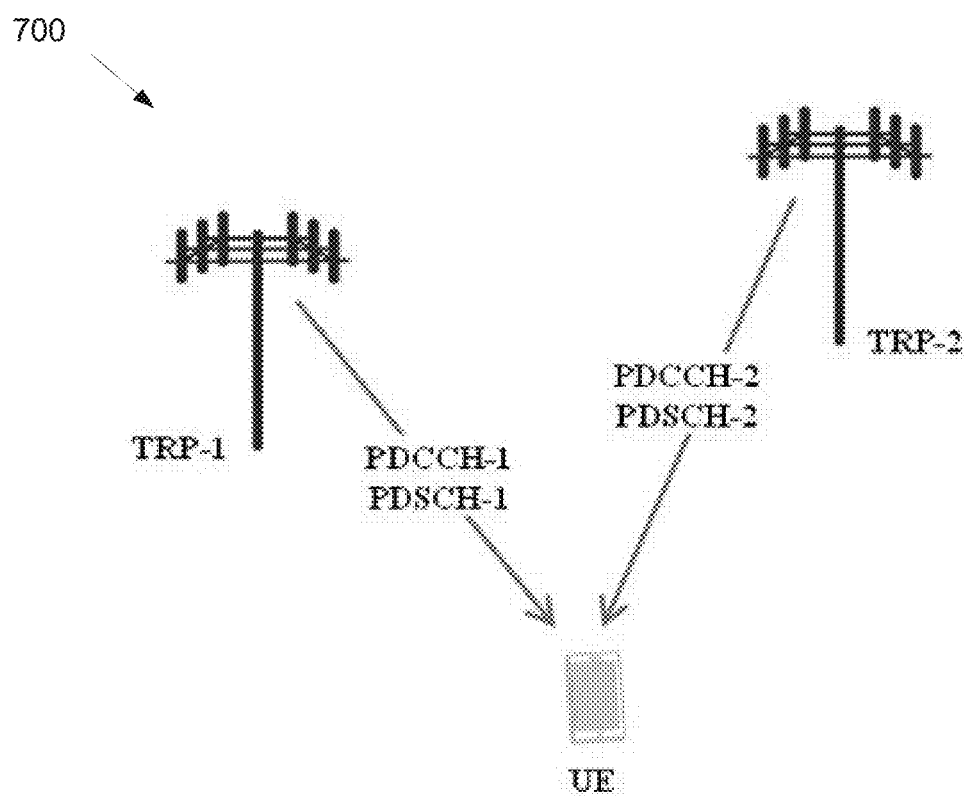
FIG. 7 illustrates an example of multi-PDCCH/DCI based multi-TRP operation according to embodiments of the present disclosure.

FIG. 7 illustrates an example of multi-PDCCH/DCI based multi-TRP operation 700 according to embodiments of the present disclosure. An embodiment of the of multi-PDCCH/DCI based multi-TRP operation 700 shown in FIG. 7 is for illustration only.

In the multi-PDCCH/DCI based multi-TRP system, separate PDCCHs are used to schedule separate PDSCHs transmitted from different TRPs. In FIG. 7, a conceptual example of the multi-PDCCH/DCI based multi-TRP operation is depicted. In this example, the multi-TRP system comprises of two TRPs, denoted by TRP-1 and TRP-2. As can be seen from FIG. 7, TRP-1 and TRP-2 have their own PDCCHs, PDCCH-1 and PDCCH-2, for separate scheduling different transport blocks for the UE on separate PDSCHs, PDSCH-1 and PDSCH-2, transmitted from TRP-1 and TRP-2, respectively. In the multi-PDCCH/DCI based multi-TRP operation, a PDCCH or a CORESET is associated with a value of a higher layer signaling index CORESETPoolIndex.

In a given slot, the UE could receive one or more A-CSI triggers (e.g., one or more non-zero CSI requests) via the multi-DCI signaling or a combination of MAC CE subselection and the multi-DCI signaling. Each A-CSI trigger points to an A-CSI trigger state (from the list of A-CSI trigger states configured to the UE) for one or multiple CSI resource settings and/or CSI reporting settings configured for one or more TRPs in the multi-TRP system. The UE would measure the aperiodic CSI-RS resources based on the configured CSI resource setting(s) and report to the network the measurement results according to the configured CSI reporting setting(s).

In the multi-PDCCH/DCI based multi-TRP operation, each A-CSI trigger, and therefore, the corresponding A-CSI trigger state, is associated with a value of CORESETPoolIndex, which is also associated with the PDCCH/DCI that signals the A-CSI trigger.

In one embodiment of Configuration-I, an A-CSI trigger state is defined for one or multiple CSI-RS resources in a single CSI resource set in a single CSI resource setting and one or multiple CSI reports in a single CSI reporting setting associated with the same value of CORESETPoolIndex.

In one embodiment of CSI resource setting in Configuration-I, the UE is higher layer configured with M=1 CSI resource setting (e.g., CSI-ResourceConfig), and the configured CSI resource setting comprises of S=1 CSI resource set. The Ks≥1 CSI-RS resources configured in the CSI resource set are divided into Ms≥1 CSI resource subsets, which could be regarded/labeled as the first CSI resource subset, the second CSI resource subset, and so on, and the Ms-th CSI resource subset; for example, the first CSI resource subset could have the lowest CSI resource subset ID value, the second CSI resource subset could have the second lowest CSI resource subset ID value, and so on, and the Ms-th CSI resource subset could have the highest CSI resource subset ID value (other association/mapping relationships between the ordering of the CSI resource subsets and the CSI resource subset ID values are also possible); each CSI resource subset, and therefore the CSI-RS resources therein, could be associated with one or more TRPs in the multi-TRP system via the CORESETPoolIndex. Denote the number of TRPs in the multi-TRP system by Ntrp.

In one example of Option-Ia.1, the mapping/association between the Ms CSI resource subsets and the Ntrp TRPs in the multi-TRP system can be established in an implicit manner via the CORESETPoolIndex. For instance, for Ms=Ntrp=2, the first CSI resource subset containing one or more CSI-RS resources could be associated with the CORESETPoolIndex of value 0 and the second CSI resource subset containing one or more CSI-RS resources could be associated with the CORESETPoolIndex of value 1. Other implicit mapping/association rules between the Ms CSI resource subsets and the Ntrp TRPs in the multi-TRP system via the CORESETPoolIndex are also possible, and they may be known to the UE a prior.

In another example of Option-Ia.2, the UE could be explicitly indicated by the network the mapping relationship/association rule between the Ms CSI resource subsets (and therefore, the corresponding CSI-RS resources therein) and different values of CORESETPoolIndex (and therefore, the corresponding Ntrp TRPs in the multi-TRP system). This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting. For instance, for Ms=Ntrp=2, the UE could be first indicated/configured by the network two CORESETPoolIndex values. The first CSI resource subset containing one or more CSI-RS resources could be associated with the first CORESETPoolIndex value (e.g., 1) and the second CSI resource subset containing one or more CSI-RS resources could be associated with the second CORESETPoolIndex value (e.g., 0). Other explicit methods of indicating the mapping relationship/association rule between the Ms CSI resource subsets and the Ntrp TRPs in the multi-TRP system via the CORESETPoolIndex are also possible.

For both Option-Ia.1 and Option-Ia.2, the UE may be higher layer configured by the network how the CSI-RS resources in the CSI resource set are partitioned into Ms CSI resource subsets. For instance, for Ms=2, the first CSI resource subset could contain the first half of the CSI-RS resources in the CSI resource set, while the second CSI resource subset could contain the second half of the CSI-RS resources in the CSI resource set.

Alternatively, the UE could receive a MAC CE based activation command indicating how the CSI-RS resources in the CSI resource set are partitioned into Ms CSI resource subsets. For example, a MAC CE message (such as a bit sequence) can be used for this purpose. The UE could also be indicated via dynamic DCI based triggering how the CSI-RS resources in the CSI resource set are partitioned into Ms CSI resource subsets. For instance, code points of a parameter in the DCI can be used for this purpose.

There are various other configuration/indication methods discussed below: (1) the partition of the CSI-RS resources in the CSI resource set into Ms CSI resource subsets is based on a combination of higher layer (RRC) configuration and MAC CE activation; (2) the partition of the CSI-RS resources in the CSI resource set into Ms CSI resource subsets is based on a combination of higher layer (RRC) configuration and DCI based triggering; (3) the partition of the CSI-RS resources in the CSI resource set into Ms CSI resource subsets is based on a combination of MAC CE activation and DCI based triggering; and/or (4) the partition of the CSI-RS resources in the CSI resource set into Ms CSI resource subsets is based on a combination of higher layer (RRC) configuration, MAC CE activation, and DCI based triggering.

In one embodiment of CSI reporting setting in Configuration-I, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports.

In one example of Option-Ib.1, the UE could report in a single reporting instance/CSI report Ng≥1 pairs/groups of resource indicators (such as SSBRIs/CRIs) and the corresponding beam metrics (such as L1-RSRPs). Each resource indicator/beam metric in each pair/group of resource indicators/beam metrics is associated with a value of CORESETPoolIndex. For instance, for Ntrp=2, the first resource indicator/beam metric in each pair/group of resource indicators/beam metrics could be associated with the CORESETPoolIndex of value 0 and the second resource indicator/beam metric in each pair/group of resource indicators/beam metrics could be associated with the CORESETPoolIndex of value 1.

Alternatively, the UE could be explicitly indicated/configured by the network the association between the resource indicators/beam metrics in each group/pair of resource indicators/beam metrics and the CORESETPoolIndex values. For instance, for Ntrp=2, the UE could be first configured/indicated by the network two different CORESETPoolIndex values. The first resource indicator/beam metric in each group/pair of resource indicators/beam metrics could be associated with the first configured CORESETPoolIndex value and the second resource indicator/beam metric in each group/pair of resource indicators/beam metrics could be associated with the second configured CORESETPoolIndex value.

In one example of Option-Ib.2, the UE could report in a single reporting instance all of or a subset of the Ntrp CSI reports dynamically, i.e., the UE could report X≤Ntrp CSI reports, {CSI(x), x=0, 1, . . . , X−1}, where the value of X could be fixed, or configured to the UE via RRC, or MAC CE, or DCI, or a combination of at least two of RRC, MAC CE, and DCI, or autonomously determined by the UE and reported to the network as part of the CSI report and/or a separate CSI parameter and/or jointly with another parameter such as RI, CRI and etc. If the value of X is chosen dynamically by the UE, the X CSI reports can be partitioned into two parts, CSI part 1 and CSI part 2.

In one example, the CSI part 1 and part 2 are as follows: (1) the CSI part 1 includes $x_1 < X$ CSI reports, where $x_1$ is fixed or configured (e.g., $x_1=1$), and an indication about the remaining $x_2 = X - x_1$ CSI reports. This information can be a bitmap of length Ntrp corresponding to different CORESETPoolIndex values. The payload (number of bits) of the CSI part 1 is fixed; and/or (2) the CSI part 2 includes the remaining $x_2$ CSI reports. The payload of the CSI part 2 is variable depending on the value of $x_2$. In one example, $x_2=0$ is allowed. In one example, $x_2>0$.

The two parts of the CSI report can be transmitted (reported) by the UE via a two-part UCI (cf. Rel. 15 two-part UCI).

In one example of Option-Ib.3, the UE could report in Ntrp separate reporting instances Ntrp CSI reports, each associated with a value of CORESETPoolIndex (and therefore, a TRP in the multi-TRP system). For instance, for Ntrp=2, the first CSI report in the first reporting instance could be associated with the CORESETPoolIndex of value 0 and the second CSI report in the second reporting instance could be associated with the CORESETPoolIndex of value 1. Alternatively, the UE could be explicitly indicated/configured by the network the association between the CSI reports and the CORESETPoolIndex values.

For instance, for Ntrp=2, the UE could be first configured/indicated by the network two different CORESETPoolIndex values. The first CSI report in the first reporting instance could be associated with the first configured CORESETPoolIndex value and the second CSI report in the second reporting instance could be associated with the second configured CORESETPoolIndex value.

In one embodiment of A-CSI trigger state(s) in Configuration-I, the A-CSI trigger state(s) in Configuration-I for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the CSI reports configured in a single CSI reporting setting (CSI-ReportConfig) where the associated CSI report(s) is linked to one or more of the Ms CSI resource subsets in a single CSI resource set configured in a single periodic, or semi-persistent, or aperiodic CSI resource setting. The A-CSI trigger state, the associated CSI report(s) and the associated CSI resource subset(s) are linked to the same value of CORESETPoolIndex.

In another instance, the Ms CSI resource subsets are linked to Ntrp CORESETPoolIndex values (and therefore, Ntrp TRPs in the multi-TRP system) following Option-Ia.1 and/or Option-Ia.2. If the CSI resource setting linked to a CSI-ReportConfig has multiple aperiodic CSI resource sets, only one of the aperiodic CSI resource sets from the CSI resource setting is associated with the trigger state, and the UE is higher layer configured per trigger state per CSI resource setting to select the one CSI-IM/NZP CSI-RS resource set from the CSI resource setting.

In yet another instance, the association between the CSI report(s) and the CORESETPoolIndex values, (and therefore, the TRPs in the multi-TRP system) could follow Option-Ib.1, Option-Ib.2, and/or Option-Ib.3.

In yet another instance, further, if, e.g., the UE is a higher layer configured/indicated that Configuration-I for the multi-TRP operation is enabled and/or the UE is configured/indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

In one embodiment of Configuration-II, an A-CSI trigger state is defined for one or multiple CSI-RS resources in a single CSI resource set in a single CSI resource setting and one or multiple CSI reporting settings associated with the same value of CORESETPoolIndex.

In one embodiment of CSI resource setting in Configuration-II, the CSI resource setting in Configuration-II is the same as the CSI resource setting in Configuration-I. That is, the UE is higher layer configured with M=1 CSI resource setting (e.g., CSI-ResourceConfig), and the configured CSI resource setting comprises of S=1 CSI resource set. The Ks≥1 CSI-RS resources configured in the CSI resource set are divided into Ms≥1 CSI resource subsets, which could be regarded/labeled as the first CSI resource subset, the second CSI resource subset, and so on, and the Ms-th CSI resource subset; for example, the first CSI resource subset could have the lowest CSI resource subset ID value, the second CSI resource subset could have the second lowest CSI resource subset ID value, and so on, and the Ms-th CSI resource subset could have the highest CSI resource subset ID value (other association/mapping relationships between the ordering of the CSI resource subsets and the CSI resource subset ID values are also possible); each CSI resource subset, and therefore the CSI-RS resources therein, could be associated with one or more TRPs in the multi-TRP system via the CORESETPoolIndex.

The detailed association/mapping between the CSI resource subsets (and therefore, the CSI-RS resources therein) and different CORESETPoolIndex values (and therefore, the TRPs in the multi-TRP system) could follow those discussed in Option-Ia.1 and Option-Ia.2.

In one embodiment of CSI reporting setting in Configuration-II, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings the CSI reporting setting ID values are also possible); each CSI reporting setting could be associated with one or more TRPs in the multi-TRP system via the CORESETPoolIndex.

In one example of Option-IIb.1, the UE could report all of or a subset of the P CSI reports dynamically (here, each CSI report is associated with a separate CSI reporting setting), i.e., the UE could report Y≤P CSI reports, {CSI(y), y=0, 1, . . . , Y−1}, where the value of Y could be fixed, or configured to the UE via RRC, or MAC CE, or DCI, or a combination of at least two of RRC, MAC CE, and DCI, or automatously determined by the UE and reported to the network as part of the CSI report and/or a separate CSI parameter and/or jointly with another parameter such as RI, CRI and etc. If the value of Y is chosen dynamically by the UE, the Y CSI reports can be partitioned into two parts, CSI part 1 and CSI part 2.

In one example, the CSI part 1 and part 2 are as follows: (1) the CSI part 1 includes $y_1$<Y CSI reports, where $y_1$ is fixed or configured (e.g., $y_1$=1), and an indication about the remaining $y_2$=Y−$y_1$ CSI reports. This information can be a bitmap of length P corresponding to different CORESETPoolIndex values. The payload (number of bits) of the CSI part 1 is fixed; and/or (2) the CSI part 2 includes the remaining $y_2$ CSI reports. The payload of the CSI part 2 is variable depending on the value of $y_2$. In one example, $y_2$=0 is allowed. In one example, $y_2$>0.

The two parts of the CSI report can be transmitted (reported) by the UE via a two-part UCI (cf. Rel. 15 two-part UCI).

In one example of Option-IIb.2, the UE could report in P separate reporting instances P CSI reports, each associated with one or more CORESETPoolIndex values (and therefore, one or more TRPs in the multi-TRP system). For instance, for P=Ntrp=2, the first CSI reporting setting could be associated with the CORESETPoolIndex of value 0 and the second CSI reporting setting could be associated with the CORESETPoolIndex of value 1.

Alternatively, the UE could be explicitly indicated by the network the mapping relationship/association rule between the P CSI reporting settings and the Ntrp CORESETPoolIndex values (and therefore, Ntrp TRPs in the multi-TRP system). This indication could be via higher layer (RRC) or/and MAC CE or/and DCI based signaling. In one example, this indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

For instance, for P=Ntrp=2, the UE could be first configured/indicated by the network two different CORESETPoolIndex values. The first CSI reporting setting could be associated with the first configured CORESETPoolIndex value (e.g., 1) and the second CSI reporting setting could be associated with the second configured CORESETPoolIndex value (e.g., 0).

In one embodiment of A-CSI trigger state(s) in Configuration-II, the A-CSI trigger state(s) in Configuration-II for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the P>1 CSI reporting settings (CSI-ReportConfig's) where the associated CSI reporting setting(s) is linked to one or more of the Ms CSI resource subsets in a single CSI resource set in a single periodic, or semi-persistent, or aperiodic CSI resource setting. The A-CSI trigger state, the associated CSI reporting setting(s) and the associated CSI resource subset(s) are linked to the same value of CORESETPoolIndex.

In another instance, the Ms CSI resource subsets are linked to Ntrp CORESETPoolIndex values (and therefore, Ntrp TRPs in the multi-TRP system) following Option-Ia.1 and/or Option-Ia.2. If the CSI resource setting linked to a CSI-ReportConfig has multiple aperiodic CSI resource sets, only one of the aperiodic CSI resource sets from the CSI resource setting is associated with the trigger state, and the UE is higher layer configured per trigger state per CSI resource setting to select the one CSI-IM/NZP CSI-RS resource set from the CSI resource setting.

In yet another instance, the P CSI reporting settings (each CSI reporting setting comprises of one or more CSI reports) are linked to Ntrp CORESETPoolIndex values (and therefore, Ntrp TRPs in the multi-TRP system) following Option-11b.1 and/or Option-IIb.2.

In yet another instance, further, if, e.g., the UE is higher layer configured/indicated that Configuration-II for the multi-TRP operation is enabled and/or the UE is configured/indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

In one embodiment of Configuration-III, an A-CSI trigger state is defined for one or multiple CSI resource sets in a single CSI resource setting and one or multiple CSI reports in a single CSI reporting setting associated with the same value of CORESETPoolIndex.

In one embodiment of CSI resource setting in Configuration-III, the UE is higher layer configured with M=1 CSI resource setting (e.g., CSI-ResourceConfig), and the configured CSI resource setting comprises of S>1 CSI resource sets, which could be regarded/labeled as the first CSI resource set, the second CSI resource set, and so on, and the S-th CSI resource set; for example, the first CSI resource set could have the lowest CSI resource set ID value, the second CSI resource set could have the second lowest CSI resource set ID value, and so on, and the S-th CSI resource set could have the highest CSI resource set ID value (other association/mapping relationships between the ordering of the CSI resource sets and the CSI resource set ID values are also possible); each CSI resource set, and therefore the CSI-RS resources therein, could be associated with one or more TRPs in the multi-TRP system via the CORESETPoolIndex.

In one example of Option-IIIa.1, the mapping/association between the S CSI resource sets and the Ntrp TRPs in the multi-TRP system can be established in an implicit manner via the CORESETPoolIndex. For instance, for S=Ntrp=2, the first CSI resource set containing one or more CSI-RS resources could be associated with the CORESETPoolIndex of value 0 and the second CSI resource set containing one or more CSI-RS resources could be associated with the CORESETPoolIndex of value 1. Other implicit mapping/association rules between the Ms CSI resource subsets and the Ntrp CORESETPoolIndex values (and therefore, Ntrp TRPs in the multi-TRP system) are also possible, and they may be known to the UE a prior.

In one example of Option-IIIa.2, the UE could be explicitly indicated by the network the mapping relationship/association rule between the S CSI resource sets (and therefore, the corresponding CSI-RS resources therein) and different CORESETPoolIndex values (and therefore, the Ntrp TRPs in the multi-TRP system). This indication could be via higher layer (RRC) or/and MAC CE or/and DCI based signaling. This indication is via a separate (dedicated) parameter or joint with another parameter.

Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting. For instance, for S=Ntrp=2, the UE could be first configured/indicated by the network two different CORESETPoolIndex values. The first CSI resource set containing one or more CSI-RS resources could be associated with the first configured CORESETPoolIndex value and the second CSI resource set containing one or more CSI-RS resources could be associated with the second configured CORESETPoolIndex value. Other explicit methods of indicating the mapping relationship/association rule between the S CSI resource sets and the Ntrp CORESETPoolIndex values (and therefore, Ntrp TRPs in the multi-TRP system) are also possible.

In one embodiment of CSI reporting setting in Configuration-III, the CSI reporting setting in Configuration-III is the same as the CSI reporting setting in Configuration-I. That is, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports. The detailed association/mapping between the CSI report(s) and the Ntrp CORESETPoolIndex values (and therefore, the Ntrp TRPs in the multi-TRP system) could follow those discussed in Option-Ib.1, Option-Ib.2, and/or Option-Ib.3.

In one embodiment of A-CSI trigger state(s) in Configuration-III, the A-CSI trigger state(s) in Configuration-3 for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the CSI reports configured in a single CSI reporting setting (CSI-ReportConfig) where the associated CSI report(s) is linked to one or more of the S>1 CSI resource sets in a single periodic, or semi-persistent, or aperiodic CSI resource setting. The A-CSI trigger state, the associated CSI report(s) and the associated CSI resource set(s) are linked to the same value of CORESETPoolIndex.

In another instance, the S CSI resource sets are linked to Ntrp CORESETPoolIndex values (and therefore, Ntrp TRPs in the multi-TRP system) following Option-IIIa.1 and/or Option-IIIa.2. In this case (e.g., the UE could be higher layer indicated/configured that Configuration-III for the multi-TRP operation is enabled), for the UE configured with the higher layer parameter CSI-AperiodicTriggerStateList, if a CSI resource setting linked to a CSI-ReportConfig has multiple (S>1) aperiodic CSI resource sets, one or more of the S aperiodic CSI resource sets from the CSI resource setting are associated with the trigger state.

In yet another instance, the association between the CSI report(s) and the CORESETPoolIndex values (and therefore, the corresponding TRPs in the multi-TRP system) could follow Option-Ib.1, Option-Ib.2, and/or Option-Ib.3.

In yet another instance, further, if, e.g., the UE is higher layer configured/indicated that Configuration-III for the multi-TRP operation is enabled and/or the UE is configured/indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

In one embodiment of Configuration-IV, an A-CSI trigger state is defined for one or multiple CSI resource sets in a single CSI resource setting and one or multiple CSI reporting settings associated with the same value of CORESETPoolIndex.

In one embodiment of CSI resource setting in Configuration-IV, the CSI resource setting in Configuration-IV is the same as the CSI resource setting in Configuration-III. That is, the UE is higher layer configured with M=1 CSI resource setting (e.g., CSI-ResourceConfig), and the configured CSI resource setting comprises of S>1 CSI resource sets, which could be regarded/labeled as the first CSI resource set, the second CSI resource set, and so on, and the S-th CSI resource set; for example, the first CSI resource set could have the lowest CSI resource set ID value, the second CSI resource set could have the second lowest CSI resource set ID value, and so on, and the S-th CSI resource set could have the highest CSI resource set ID value (other association/mapping relationships between the ordering of the CSI resource sets and the CSI resource set ID values are also possible); each CSI resource set, and therefore the CSI-RS resources therein, could be associated with one or more TRPs in the multi-TRP system via the CORESETPoolIndex.

The detailed association/mapping between the S CSI resource sets and different CORESETPoolIndex values (and therefore, the Ntrp TRPs in the multi-TRP system) could follow those discussed in Option-IIIa.1, and/or Option-IIIa.2.

In one embodiment of CSI reporting setting in Configuration-IV, the CSI reporting setting in Configuration-IV is the same as the CSI reporting setting in Configuration-II. That is, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/ mapping relationships between the ordering of the CSI reporting settings the CSI reporting setting ID values are also possible); each CSI reporting setting could be associated with one or more TRPs in the multi-TRP system via the CORESETPoolIndex.

A single TRP in the multi-TRP system could be associated with a single CSI reporting setting. The detailed association/ mapping between the P CSI reporting settings and different CORESETPoolIndex values (and therefore, the Ntrp TRPs in the multi-TRP system) could follow those discussed in Option-IIb.1 and/or Option-IIb.2.

In one embodiment of A-CSI trigger state(s) in Configuration-IV, the A-CSI trigger state(s) in Configuration-IV for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the P>1 CSI reporting settings (CSI-ReportConfig's) where the associated CSI reporting setting(s) is linked to one or more of the S CSI resource sets in a single periodic, or semi-persistent, or aperiodic CSI resource setting.

In another instance, the S CSI resource sets are linked to Ntrp CORESETPoolIndex values (and therefore, Ntrp TRPs in the multi-TRP system) following Option-IIIa.1 and/or Option-IIIa.2. In this case (e.g., the UE could be higher layer indicated/configured that Configuration-IV for the multi-TRP operation is enabled), for the UE configured with the higher layer parameter CSI-AperiodicTriggerStateList, if a CSI resource setting linked to a CSI-ReportConfig has multiple (S>1) aperiodic CSI resource sets, one or more of the S aperiodic CSI resource sets from the CSI resource setting are associated with the trigger state.

In yet another instance, the P CSI reporting settings (each CSI reporting setting comprises of one or more CSI reports) are linked to Ntrp CORESETPoolIndex values (and therefore, Ntrp TRPs in the multi-TRP system) following Option-11b.1 and/or Option-IIb.2.

In yet another instance, further, if, e.g., the UE is higher layer configured/indicated that Configuration-IV for the multi-TRP operation is enabled and/or the UE is configured/ indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

In one embodiment of Configuration-V, an A-CSI trigger state is defined for one or multiple CSI resource settings and one or multiple CSI reports in a single CSI reporting setting associated with the same value of CORESETPoolIndex.

In one embodiment of CSI resource setting in Configuration-V, the UE is higher layer configured with M>1 CSI resource settings (e.g., CSI-ResourceConfig's with different CSI resource setting IDs CSI-ResourceConfigId's), which could be regarded/labeled as the first CSI resource setting, the second CSI resource setting, and so on, and the M-th CSI resource setting; for example, the first CSI resource setting could have the lowest CSI resource setting ID value, the second CSI resource setting could have the second lowest CSI resource setting ID value, and so on, and the M-th CSI resource setting could have the highest CSI resource setting ID value (other association/mapping relationships between the ordering of the CSI resource settings and the CSI resource setting ID values are also possible); each CSI resource setting, and therefore the CSI resource set(s)/ resource(s) therein, could be associated with one or more TRPs in the multi-TRP system via the CORESETPoolIndex.

In one example of Option-Va.1, the mapping/association between the M CSI resource settings and the Ntrp TRPs in the multi-TRP system can be established in an implicit manner via the CORESETPoolIndex. For instance, for M=Ntrp=2, the first CSI resource setting containing one or more CSI resource sets/resources could be associated with the CORESETPoolIndex of value 0 and the second CSI resource setting containing one or more CSI resource sets/ resources could be associated with the CORESETPoolIndex of value 1. Other implicit mapping/association rules between the M CSI resource settings and the Ntrp CORESETPoolIndex values (and therefore, the Ntrp TRPs in the multi-TRP system) are also possible, and they may be known to the UE a prior.

In one example of Option-Va.2, the UE could be explicitly indicated by the network the mapping relationship/association rule between the M CSI resource settings (and therefore, the corresponding CSI resource sets/resources therein) and different CORESETPoolIndex values (and therefore, the Ntrp TRPs in the multi-TRP system). This indication could be via higher layer (RRC) or/and MAC CE or/and DCI based signaling. This indication is via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

For instance, for M=Ntrp=2, the UE could be first configured/indicated by the network two different CORESETPoolIndex values. The first CSI resource setting containing one or more CSI resource sets/resources could be associated with the first configured CORESETPoolIndex value and the second CSI resource setting containing one or more CSI resource sets/resources could be associated with the second configured CORESETPoolIndex value. Other explicit methods of indicating the mapping relationship/association rule between the M CSI resource settings and the Ntrp CORESETPoolIndex values (and therefore, the Ntrp TRPs in the multi-TRP system) are also possible.

In one embodiment of CSI reporting setting in Configuration-V, the CSI reporting setting in Configuration-V is the same as the CSI reporting setting in Configuration-I. That is, the UE is higher layer configured with P=1 CSI reporting setting. The single CSI reporting setting is for all Ntrp TRPs in the multi-TRP system. The P=1 CSI reporting setting can include one CSI report for all TRPs in the multi-TRP system or more than one (e.g., one CSI report per TRP in the multi-TRP system) CSI reports. The detailed association/ mapping between the CSI report(s) and the Ntrp CORESETPoolIndex values (and therefore, the Ntrp TRPs in the multi-TRP system) could follow those discussed in Option-Ib.1, Option-Ib.2, and/or Option-Ib.3.

In one embodiment of A-CSI trigger state(s) in Configuration-V, the A-CSI trigger state(s) in Configuration-V for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the CSI reports configured in a single CSI reporting setting (CSI-ReportConfig) where the associated CSI report(s) is linked to one or more of the M>1 periodic, or semi-persistent, or aperiodic CSI resource settings.

In another instance, the M CSI resource settings are linked to Ntrp CORESETPoolIndex values (and therefore, Ntrp TRPs in the multi-TRP system) following Option-Va.1 and/or Option-Va.2. In this case (e.g., the UE could be higher layer indicated/configured that Configuration-V for the multi-TRP operation is enabled), for the UE configured with the higher layer parameter CSI-AperiodicTriggerStateList, one or more of the M CSI resource settings are associated with the trigger state.

In yet another instance, the association between the CSI report(s) and different CORESETPoolIndex values (and therefore, the TRPs in the multi-TRP system) could follow Option-Ib.1, Option-Ib.2, and/or Option-Ib.3.

In yet another instance, further, if, e.g., the UE is higher layer configured/indicated that Configuration-V for the multi-TRP operation is enabled and/or the UE is configured/indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

In one embodiment of Configuration-VI, an A-CSI trigger state is defined for one or multiple CSI resource settings and one or multiple CSI reporting settings associated with the same value of CORESETPoolIndex.

In one embodiment of CSI resource setting in Configuration-VI, the CSI resource setting in Configuration-VI is the same as the CSI resource setting in Configuration-V. That is, the UE is higher layer configured with M>1 CSI resource settings (e.g., CSI-ResourceConfig's with different CSI resource setting IDs CSI-ResourceConfigId's), which could be regarded/labeled as the first CSI resource setting, the second CSI resource setting, and so on, and the M-th CSI resource setting; for example, the first CSI resource setting could have the lowest CSI resource setting ID value, the second CSI resource setting could have the second lowest CSI resource setting ID value, and so on, and the M-th CSI resource setting could have the highest CSI resource setting ID value (other association/mapping relationships between the ordering of the CSI resource settings and the CSI resource setting ID values are also possible); each CSI resource setting, and therefore the CSI resource set(s)/resource(s) therein, could be associated with one or more TRPs in the multi-TRP system via the CORESETPoolIndex.

The detailed association/mapping between the M CSI resource settings and the Ntrp CORESETPoolIndex values (and therefore, the Ntrp TRPs in the multi-TRP system) could follow those discussed in Option-Va.1 and/or Option-Va.2.

In one embodiment of CSI reporting setting in Configuration-VI, the CSI reporting setting in Configuration-VI is the same as the CSI reporting setting in Configuration-II. That is, the UE is higher layer configured with P>1 CSI reporting settings, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings the CSI reporting setting ID values are also possible); each CSI reporting setting could be associated with one or more TRPs in the multi-TRP system via the CORESETPoolIndex.

A single TRP in the multi-TRP system could be associated with a single CSI reporting setting. The detailed association/mapping between the P CSI reporting settings and the Ntrp CORESETPoolIndex values (and therefore, the Ntrp TRPs in the multi-TRP system) could follow those discussed in Option-IIb.1 and/or Option-IIb.2.

In one embodiment of A-CSI trigger state in Configuration-VI, the A-CSI trigger state in Configuration-VI for CSI reporting setting(s) (configured with the higher layer parameter reportConfigType set to "aperiodic") and/or CSI resource setting (higher layer parameter CSI-ResourceConfig) for channel and/or interference measurement on one or more component carriers is defined as following instances.

In one instance, each A-CSI trigger state configured using the higher layer parameter CSI-AperiodicTriggerState is associated with one or more of the P CSI reporting settings (CSI-ReportConfig's) where the associated CSI reporting setting(s) is linked to one or more of the M periodic, or semi-persistent, or aperiodic CSI resource settings.

In another instance, the M CSI resource settings are linked to Ntrp CORESETPoolIndex values (and therefore, Ntrp TRPs in the multi-TRP system) following Option-Va.1 and/or Option-Va.2. In this case (e.g., the UE could be higher layer indicated/configured that Configuration-VI for the multi-TRP operation is enabled), for the UE configured with the higher layer parameter CSI-AperiodicTriggerStateList, one or more of the M CSI resource settings are associated with the trigger state.

In yet another instance, the P CSI reporting settings (each CSI reporting setting comprises of one or more CSI reports) are linked to Ntrp CORESETPoolIndex values (and therefore, Ntrp TRPs in the multi-TRP system) following Option-11b.1 and/or Option-IIb.2.

In yet another instance, further, if, e.g., the UE is higher layer configured/indicated that Configuration-VI for the multi-TRP operation is enabled and/or the UE is configured/indicated by the network that the group based beam/CSI reporting for the multi-TRP operation is enabled, the UE is expected to receive more than one DCI with non-zero CSI request per slot, and the UE is expected to receive more than one aperiodic CSI report request for transmission in a given slot.

One or more of the CSI resource settings/configurations, one or more of the CSI report settings/configurations, and/or one or more of the A-CSI trigger states defined in Configuration-I, Configuration-II, Configuration-III, Configuration-IV, Configuration-V, and/or Configuration-VI could be enabled when the UE is indicated/configured by the network that the group based beam/CSI reporting for the multi-TRP operation is enabled. This indication could be via higher layer (RRC) or/and MAC CE or/and DCI based signaling. This indication is via a separate (dedicated) parameter or joint with another parameter.

Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

Figure 8:
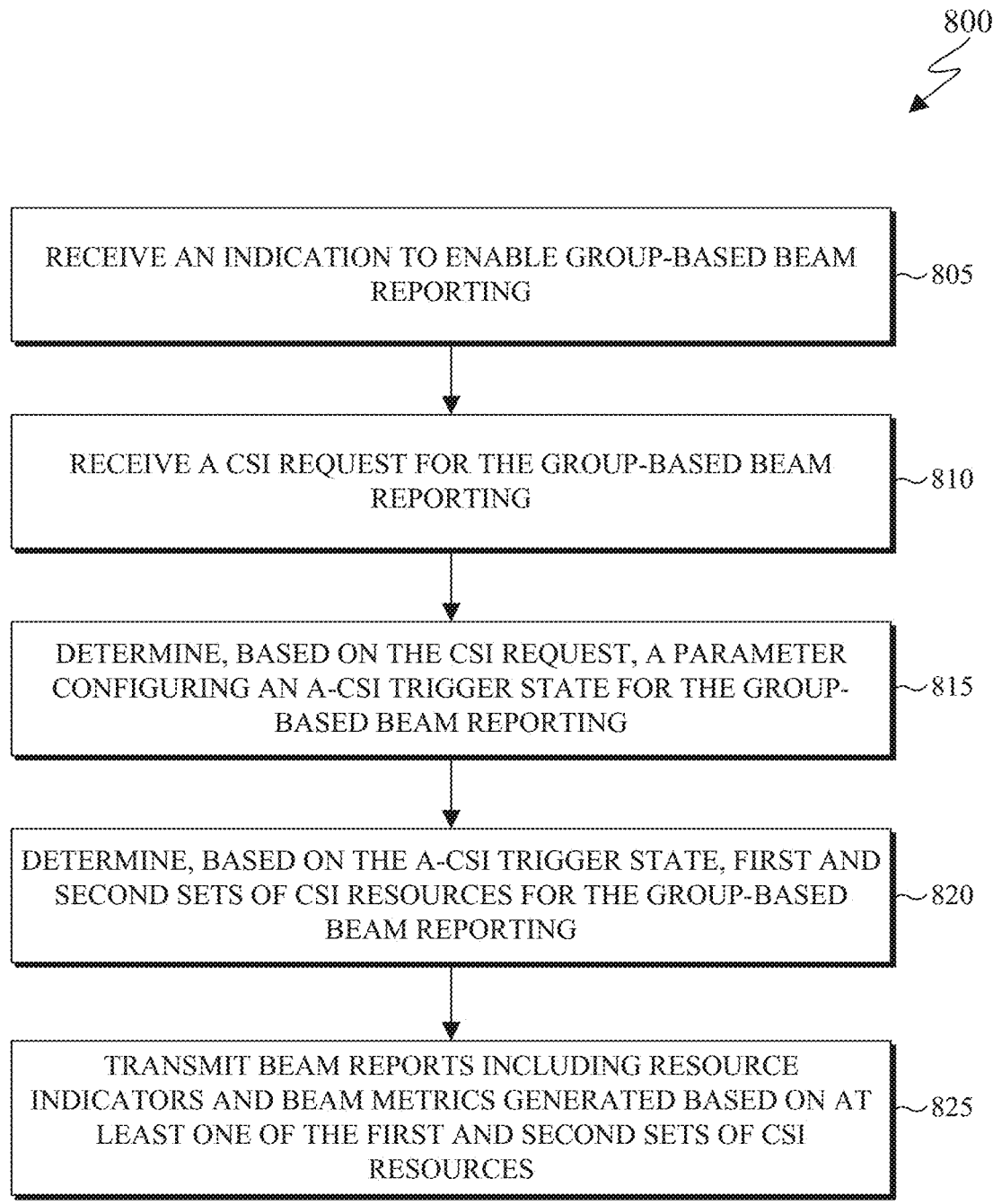
FIG. 8 illustrates an example of a process for a UE to determine and transmit beam reports according to A-CSI resource configuration, measurement and reporting in a wireless communication system according to embodiments of the present disclosure.

FIG. 8 illustrates a process 800 for a UE to determine and transmit beam reports according to A-CSI resource configuration, measurement and reporting in a wireless communication system. For example, the process 800 illustrated in FIG. 8 may be implemented by one or more of the UEs 111-116 in FIG. 1 and an analogous process may be implemented by one or more BS s, for example, BS s 101-103 in FIG. 1. An embodiment of the process 800 shown in FIG. 8 is provided for illustration only.

The process begins with the UE receiving an indication to enable group-based beam reporting (step 805). The UE then receives a CSI request for the group-based beam reporting (step 810).

Thereafter, the UE determines, based on the CSI request, a parameter configuring an A-CSI trigger state for the group-based beam reporting (step 815). For example, in step 815, the UE determines, based on the A-CSI trigger state, first and second aperiodic CSI resource sets for channel measurement associated with the parameter configuring the A-CSI trigger state. One of the first or second aperiodic CSI resource sets corresponds to at least one of a SSB resource set; and a NZP CSI-RS resource set. The first aperiodic CSI resource set associated with the parameter configuring the A-CSI trigger state corresponds to the first set of CSI resources. The second aperiodic CSI resource set associated with the parameter configuring the A-CSI trigger state corresponds to the second set of CSI resources.

Thereafter, the UE then determines, based on the A-CSI trigger state, first and second sets of CSI resources for the group-based beam reporting (step 820). For example, in step 820, the UE may receive one or more periodic or semi-persistent CSI resource settings for channel measurement of at least one of the first and second sets of CSI resources and determine, based on the A-CSI trigger state, one or more CSI reporting settings for transmitting the beam reports. The one or more CSI reporting settings are linked to a periodic or semi-persistent CSI resource setting. The periodic or semi-persistent CSI resource setting indicate first and second CSI resource sets. The first and second CSI resource sets each correspond to a SSB resource set or a NZP CSI-RS resource set. The first CSI resource set indicated in the periodic or semi-persistent CSI resource setting corresponds to the first set of CSI resources. The second CSI resource set indicated in the periodic or semi-persistent CSI resource setting corresponds to the second set of CSI resources.

Thereafter, the UE transmits beam reports generated based on at least one of the first and second sets of CSI resources (step 825). For example, in step 825, the beam reports may include resource indicators and beam metrics. In various embodiments, the UE measures one or more first RSs from the first set of CSI resources and one or more second RSs from the second set of CSI resources, determines, based on the one or more measured first RSs, a first resource indicator, and determines, based on the one or more measured second RSs, a second resource indicator. The first or second resource indicators correspond to at least one of a SSBRI and a CRI. The transmitting of the beam report may include transmitting, based on the group-based beam reporting being enabled, the first and second resource indicators in a single CSI reporting instance.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
  receive an indication to enable group-based beam reporting; and
  receive downlink control information (DCI) including a channel state information (CSI) request; and
a processor operably coupled to the transceiver, the processor configured to:
  identify, based on the CSI request, information associated with an aperiodic CSI (A-CSI) trigger state; and
  identify a first CSI resource set and a second CSI resource set for the group-based beam reporting, based on the indication configured, wherein the first CSI resource set and the second CSI resource set are linked to a CSI report setting associated with the A-CSI trigger state,
wherein the transceiver is further configured to receive a list of A-CSI trigger states, each A-CSI trigger state of the list being associated with one or more CSI reports,
wherein the processor is further configured to identify that the CSI report setting associated with the A-CSI trigger state indicated by the CSI request is for an aperiodic CSI report,
wherein the CSI report setting is linked to one of a periodic CSI resource setting or a semi-persistent CSI resource setting,
wherein the transceiver is further configured to transmit, for the group-based beam reporting, resource indicators generated based on at least one of the first CSI resource set and the second CSI resource set, and
wherein the resource indicators correspond to at least one of: (1) a synchronization signal block resource indicator (SSBRI) and (2) a CSI reference signal resource indicator (CRI).

2. The UE of claim 1, wherein the first CSI resource set and the second CSI resource set are included in the periodic CSI resource setting or the semi-persistent CSI resource setting.

3. The UE of claim 1, wherein each of the first CSI resource set and the second CSI resource set corresponds to at least one of:
a synchronization signal block (SSB) resource set; and
a non-zero-power (NZP) CSI reference signal (CSI-RS) resource set.

4. The UE of claim 1, wherein, in case that the CSI report setting is linked to an aperiodic CSI resource setting:
the first CSI resource set corresponds to a first aperiodic CSI resource set for channel measurement, and
the second CSI resource set corresponds to a second aperiodic CSI resource set for channel measurement.

5. The UE of claim 1, wherein the processor is further configured to:
   measure one or more first reference signals (RSs) from the first CSI resource set and one or more second RSs from the second CSI resource set;
   determine, based on the measured one or more first RSs, a first resource indicator; and
   determine, based on the measured one or more second RSs, a second resource indicator.

6. The UE of claim 5, wherein based on the group-based beam reporting being enabled, the transceiver is further configured to transmit, in a single CSI reporting instance, the first resource indicator and the second resource indicator as the resource indicators.

7. A base station (BS), comprising:
   a processor; and
   a transceiver operably coupled to the processor, the transceiver configured to:
      transmit an indication to enable group-based beam reporting;
      transmit downlink control information (DCI) including a channel state information (CSI) request for indicating information associated with an aperiodic CSI (A-CSI) trigger state;
      transmit a list of A-CSI trigger states, each A-CSI trigger state of the list being associated with one or more CSI reports; and
      receive resource indicators for the group-based beam reporting based on at least one of a first CSI resource set and a second CSI resource set,
   wherein the first CSI resource set and the second CSI resource set are configured based on the indication being configured and the first CSI resource set and the second CSI resource set are linked to a CSI report setting associated with the A-CSI trigger state,
   wherein the CSI report setting associated with the A-CSI trigger state indicated by the CSI request is for an aperiodic CSI report,
   wherein the CSI report setting is linked to one of a periodic CSI resource setting or a semi-persistent CSI resource setting, and
   wherein the resource indicators correspond to at least one of: (1) a synchronization signal block resource indicator (SSBRI) and (2) a CSI reference signal resource indicator (CRI).

8. The BS of claim 7, wherein the first CSI resource set and the second CSI resource set are included in the periodic CSI resource setting or the semi-persistent CSI resource setting.

9. The BS of claim 7, wherein each of the first CSI resource set and the second CSI resource set corresponds to at least one of:
   a synchronization signal block (SSB) resource set; and
   a non-zero-power (NZP) CSI reference signal (CSI-RS) resource set.

10. The BS of claim 7, wherein, in case that the CSI report setting is linked to an aperiodic CSI resource setting:
   the first CSI resource set corresponds to a first aperiodic CSI resource set for channel measurement, and
   the second CSI resource set corresponds to a second aperiodic CSI resource set for channel measurement.

11. The BS of claim 7, wherein:
   a first resource indicator is based on first reference signals (RSs) from the first CSI resource set, and
   a second resource indicator is based on second RSs from the second CSI resource set.

12. The BS of claim 11, wherein the transceiver is further configured to receive, in a single CSI reporting instance, the first resource indicator and the second resource indicator as the resource indicators based on the group-based beam reporting being enabled.

13. A method performed by a user equipment (UE) in a wireless communication system, the method comprising:
   receiving an indication to enable group-based beam reporting;
   receiving downlink control information (DCI) including a channel state information (CSI) request;
   identifying, based on the CSI request, information associated with an aperiodic CSI (A-CSI) trigger state;
   identifying a first CSI resource set and a second CSI resource set for the group-based beam reporting based on the indication configured, wherein the first CSI resource set and the second CSI resource set are linked to a CSI report setting associated with the A-CSI trigger state;
   receiving a list of A-CSI trigger states, each A-CSI trigger state of the list being associated with one or more CSI reports;
   identifying that the CSI report setting associated with the A-CSI trigger state indicated by the CSI request is for an aperiodic CSI report, wherein the CSI report setting is linked to one of a periodic CSI resource setting or a semi-persistent CSI resource setting; and
   transmitting, for the group-based beam reporting, resource indicators generated based on at least one of the first CSI resource set and the second CSI resource set,
   wherein resource indicators correspond to at least one of: (1) a synchronization signal block resource indicator (SSBRI) and (2) a CSI reference signal resource indicator (CRI).

14. The method of claim 13, wherein the first CSI resource set and the second CSI resource set are included in the periodic CSI resource setting or the semi-persistent CSI resource setting.

15. The method of claim 13, wherein each of the first CSI resource set and the second CSI resource set corresponds to at least one of:
   a synchronization signal block (SSB) resource set; and
   a non-zero-power (NZP) CSI reference signal (CSI-RS) resource set.

16. The method of claim 13, wherein, in case that the CSI report setting is linked to an aperiodic CSI resource setting:
   the first CSI resource set corresponds to a first aperiodic CSI resource set for channel measurement, and
   the second CSI resource set corresponds to a second aperiodic CSI resource set for channel measurement.

17. The method of claim 13, further comprising:
   measuring one or more first reference signals (RSs) from the first CSI resource set and one or more second RSs from the second CSI resource set;
   determining, based on the one or more measured first RSs, a first resource indicator; and
   determining, based on the one or more measured second RSs, a second resource indicator,
   wherein transmitting the resource indicators comprises, based on the group-based beam reporting being enabled, transmitting, in a single CSI reporting instance, the first resource indicator and the second resource indicator as the resource indicators.

* * * * *